[19] United States Patent
Althaus et al.

(10) Patent No.: US 11,757,697 B2
(45) Date of Patent: Sep. 12, 2023

(54) SYSTEM AND METHOD OF DISTRIBUTED EDGE CONFIGURATION MANAGEMENT

(71) Applicant: RackN, Inc., Austin, TX (US)

(72) Inventors: Gregory S. Althaus, Austin, TX (US); Robert A. Hirschfeld, Austin, TX (US)

(73) Assignee: RackN, Inc., Round Rock, TX (US)

(*) Notice: Subject to any disclaimer, the term of this patent is extended or adjusted under 35 U.S.C. 154(b) by 68 days.

(21) Appl. No.: 16/917,500

(22) Filed: Jun. 30, 2020

(65) Prior Publication Data
US 2021/0083922 A1 Mar. 18, 2021

Related U.S. Application Data

(60) Provisional application No. 62/899,642, filed on Sep. 12, 2019.

(51) Int. Cl.
H04L 41/042 (2022.01)
H04L 41/08 (2022.01)
H04L 67/288 (2022.01)
G06F 9/48 (2006.01)
H04L 41/0859 (2022.01)

(52) U.S. Cl.
CPC .......... H04L 41/042 (2013.01); G06F 9/48 (2013.01); H04L 41/08 (2013.01); H04L 41/0863 (2013.01); H04L 41/0886 (2013.01); H04L 67/288 (2013.01)

(58) Field of Classification Search
CPC ... H04L 41/042; H04L 41/08; H04L 41/0886; H04L 41/0863
See application file for complete search history.

(56) References Cited

U.S. PATENT DOCUMENTS

| 8,868,701 B1* | 10/2014 | Peters | H04L 41/0813 709/221 |
| 10,700,964 B1* | 6/2020 | Yuan | H04L 43/0864 |
| 2002/0099787 A1* | 7/2002 | Bonner | H04L 41/0846 709/216 |
| 2006/0047798 A1* | 3/2006 | Feinleib | G06F 8/61 709/223 |

(Continued)

Primary Examiner — Nam T Tran
(74) Attorney, Agent, or Firm — Gary Stanford; Huffman Law Group, PC

(57) ABSTRACT

A federation with distributed edge configuration management including multiple data centers, each including an infrastructure, at least one storage, and a configuration platform. The infrastructure includes physical resources including at least one computer server. The storage stores state information indicative of a current state of the infrastructure and configuration information of the infrastructure. The configuration information includes composed immutable content incorporating automation tasks and instructions to effectuate state changes of the infrastructure. The configuration platform includes a network interface and a configuration processor that configures the infrastructure by generating and executing a workflow that includes a sequence of operations to effectuate a change of state of the infrastructure. The composed immutable content may include catalog units of subcomponents each including one or more declarative instructions. Catalog units or subcomponents may be grouped into version sets managed by a version set manager.

23 Claims, 16 Drawing Sheets

(56) References Cited

U.S. PATENT DOCUMENTS

2011/0179031 A1* 7/2011 Sekiguchi ............ G06F 16/256
707/737
2020/0382372 A1* 12/2020 Easwar Prasad ... H04L 41/0813

* cited by examiner

SYSTEM AND METHOD OF DISTRIBUTED EDGE CONFIGURATION MANAGEMENT

CROSS REFERENCE TO RELATED APPLICATION(S)

This application claims benefit of U.S. Provisional Application Ser. No. 62/899,642, filed on Sep. 12, 2019, which is hereby incorporated by reference in its entirety for all intents and purposes. This application is related to U.S. patent application Ser. No. 16/715,299, filed on Dec. 16, 2019, entitled "Distributed Federation of Endpoints with Proxy Synchronization," which is hereby incorporated by reference in its entirety for all intents and purposes.

BACKGROUND OF THE INVENTION

Field of the Invention

The present invention relates in general to data center automation, and more particularly to a system and method of distributed edge configuration management in which distributed autonomous data centers of a federation operate both autonomously and under hierarchical federation control by storing and using configuration information comprising composed immutable content that may be widely distributed in the federation with or without direct or consistent connectivity.

Description of the Related Art

A data center is a collection of servers (e.g., computer servers) and other resources for performing computational work. The data center may include, for example, an infrastructure which further includes computational resources, storage devices, network communication and network access devices, etc. The computational work may include various applications including performance of various tasks including complex tasks, operation and management of websites, virtual computer execution, access and control, etc. A data center may be located at any one or more of several different site configurations, such as, for example, a home, an automobile, a ship, a space craft, a cell tower, an office or office building, a retail location, a computer center or building, etc. The term "site" is often used interchangeably with the term "data center," although a site generally refers to a physical location or platform which typically includes one data center but may include more than one separate data centers.

Managing even a single data center can be challenging over time. Managing a federation of multiple data centers is exponentially more difficult and becomes more complicated as the number of data centers increases. Each data center should remain autonomous, meaning that each should be successfully operated without human intervention or supervision. Although each data center may be managed independently, such management becomes more difficult as the number of managed data centers increases. As the number of data centers increases, collective management becomes more practicable. Some conventional federation architectures employ a star management architecture including a central management hub that is independently interfaced with each of the primary data centers. The data centers that are managed by a central hub of a star architecture often compromise data center autonomy when network connectivity is unavailable.

Cloud computing introduced the concept of large scale data centers with Application Programming Interface (API) based infrastructure control. Such architecture provided advantages for control and automation using virtualization and infrastructure APIs from a centralized API. The conventional design benefited from scale at individual data centers; however, the conventional architecture did not function well when the number of data centers became significantly large, such as on the order of hundreds or thousands of data centers or more.

In a more distributed environment with hundreds or even thousands of integrated data centers, the conventional architecture did not provide aggregated views and hierarchical control of the entire environment without interfering with data center autonomy.

SUMMARY OF THE INVENTION

A federation with distributed edge configuration management according to one embodiment includes multiple data centers, each including an infrastructure, at least one storage, and a configuration platform. The infrastructure includes physical resources including at least one computer server. The storage stores state information indicative of a current state of the infrastructure and configuration information of the infrastructure. The configuration information includes composed immutable content incorporating automation tasks and instructions to effectuate state changes of the infrastructure. The configuration platform includes a network interface and a configuration processor that configures the infrastructure by generating and executing a workflow that includes a sequence of operations to effectuate a change of state of the infrastructure.

The composed immutable content may be decomposed on multiple modular layers of the storage that are managed independently from each other. The composed immutable content may include a catalog unit, in which the catalog unit includes multiple subcomponents, in which each subcomponent includes at least one declarative instruction. The configuration platform may facilitate a change of any of the subcomponents only by replacing the catalog unit.

The composed immutable content may include a catalog unit having a first identity. The catalog unit may include multiple subcomponents, each including at least one declarative instruction. The configuration platform may facilitate a change of any subcomponent only by replacing the subcomponent with an updated subcomponent and by changing the first identity of the catalog unit to a second identity.

The composed immutable content may include a version set having a first version identifier. The version set may include multiple subcomponents, each including at least one declarative instruction. The configuration platform may facilitate a change of any subcomponent by replacing the subcomponent with an updated subcomponent and by changing the first version identifier of the version set to a second version identifier.

The composed immutable content my include a version set having a first version identifier, in which the version set includes catalog units each having a unique identifier. Each catalog unit may include at least one subcomponent, in which each subcomponent may include at least one declarative instruction. The configuration platform may facilitate a change of any subcomponent within a catalog unit by replacing the subcomponent with an updated subcomponent, by changing the identifier of the catalog unit to an updated unique identifier, and by changing the first version identifier of the version set to a second version identifier. The first version identifier may identify a first version set and the second version identifier may identify a second version set, in which the first and second version sets may be part of a common version set family.

The configuration platform, responsive to an infrastructure configuration request received via a communication network, may access and update the stored configuration information with updated configuration information provided by the infrastructure configuration request.

The federation may include a version set manager including a repository and a set of version sets. The repository stores multiple subcomponents. Each version set may include selected subcomponents stored in the repository. The version set manager may be operated by a first data center that manages an installed version set of a second data center. The version set manager may be incorporated within the configuration platform of a first data center. The version set manager may be incorporated within the configuration platform of a first data center for managing a first version set of the first data center and for managing a second version set of a second data center. The version set manager may manage a first version set of a first data center and also may manage a second version set of a second data center.

A first data center of the federation may include different infrastructures and corresponding different configuration platforms, in which the version set manager manages an installed version set of each of the configuration platforms. A first infrastructure may include a development infrastructure for developing a version set, a second infrastructure may include a test infrastructure for testing a developed version set, and a third infrastructure may include a production infrastructure for placing a tested version set into production.

The federation may further include a first data center including different configuration platforms each for redundantly managing the infrastructure of the first data center. In this case the version set manager may manage an installed version set of each configuration platform.

A version set manager may instruct the configuration platform to update the version set and to execute a series of operations that ensure that the infrastructure complies with an updated version set. The series of operations may identify a failure of the updated version set and trigger the version set manager to re-install an original version set. The series of operations may identify a failure of the updated version set and include at least one internal trigger that instructs the configuration platform to re-install an original version set.

The federation may further include a shared repository that stores multiple subcomponents, and multiple version set managers, each including a set of version sets in which each version set includes selected subcomponents stored in the repository. The version set managers may collectively manage a version set used by the configuration platform of a first data center. Each version set manager may be operated by a corresponding one of multiple data centers other than the first data center.

The federation may further include first and second version set managers, each including a repository storing subcomponents and further including a set of version sets in which each version set includes selected subcomponents stored in the repository, and a first data center including first and second configuration platforms each for redundantly managing the infrastructure of the first data center. The first configuration platform may incorporate the first version set manager for managing first and second version sets of composed immutable content of each of the first and second configuration platforms, respectively, in which the second version set manager manages the version sets of the first version set manager. The second version set manager may be operated by a second data center.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
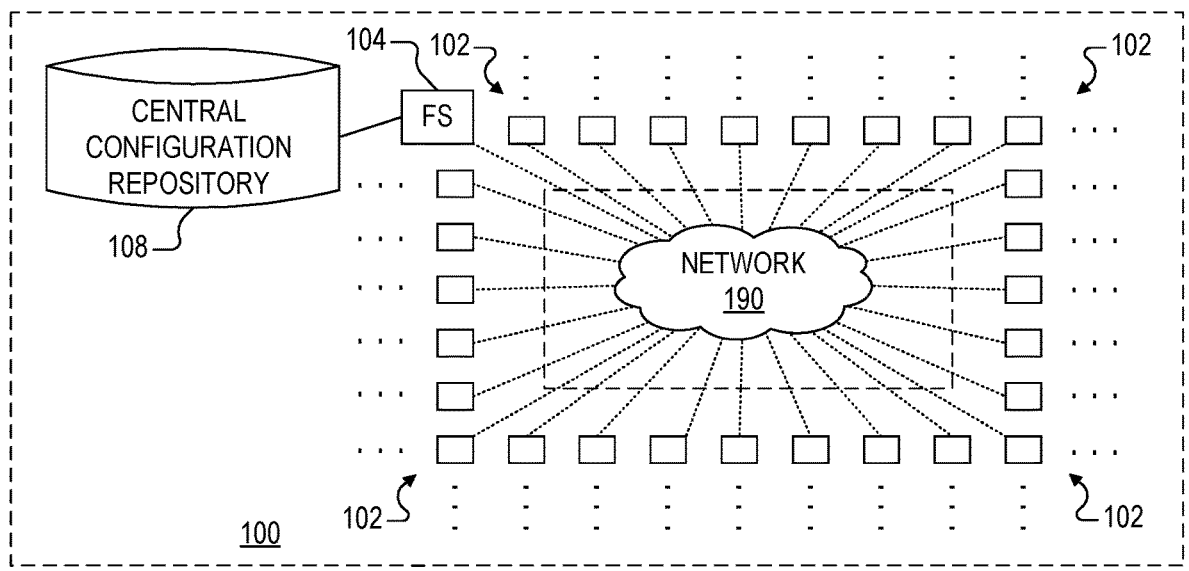
FIG. 1 is a simplified block diagram of a federation according to one embodiment of the present disclosure including multiple data centers interfaced via a communication network.

The inventors have recognized the need to provide aggregated views and hierarchical control of the entire environment of large scale federation of data centers without interfering with site autonomy. Each data center may be operated differently such that there is a need for a standard management platform that includes a standard set of operational practices that are consistent across multiple data centers. Distributed management is especially challenging because each data center under management should have both a distinct and referentially complete description of the configuration of each data center. The data centers cannot rely on direct centralized management and should be able to operate autonomously. For this reason, the configuration at each data center should be self-contained to manage the data center without external control. In addition to autonomy, each data center of a federation may be unique. In most operating models, this combination of isolation and variation makes it difficult to create consistent or repeatable automation. Even data centers that start with a nearly identical setup quickly drift as updates are applied. This makes it impractical to manage even a dozen different data centers using conventional methods.

A system and method of distributed edge configuration management as described herein is able to address thousands of data centers and is able to accommodate center by center variation in a consistent way that does not require operators to track the differences. Operators are able to define a portable configuration package that can be reliably applied to a wide range of data centers. There are three interrelated aspects of this distributed configuration approach, including composition, immutability and versioning. All three of these concepts may be used for distributed configuration management because they allow operators to reliably coordinate discrete and disconnected data centers.

Composable (or composed) content means individual management units can be made from other management units. While each unit is an atomic unit, an item made from other units is also considered atomic. When managed individually, operators may make changes to a single item without impacting other items in the system. When referenced as a composed unit, each of the individual components may be managed together. It is noted that items may have dependencies on other items. In these cases, the atomicity of a unit may be limited until its prerequisites are met. It is implied that units that are composed together either satisfy all the individual prerequisites or the composed object inherits the unmet prerequisites. With composed items, it is assumed that the system managing the items can inspect both the composite and the individual items. This allows the manager to operate at the composite level by taking actions on individual items. The benefit of this assumption is that large composite operations can be decomposed by the manager.

Immutable content means that individual management units cannot be changed after they have been installed making them effectively read-only (RO) during operation. Unlike true read-only items, immutable content can be replaced or deleted as an external management operation. This makes immutable content very useful when managing configuration or automation distributed between many data centers because it allows the operators to create common components to be used at many data centers. Operators using immutable content can ensure that data centers do not modify key aspects of their configuration or automation. Local modifications create operational problems when not tightly controlled because they should be respected during updates. Operators can safely distribute updates by ensuring that data center components are immutable. Immutable components also means that management artifacts can be reliability shared between data centers without having to rely on a central distribution point.

Versioning references a group of related items with variations over time. A side effect of immutable content is that operators may have many artifacts that are basically the same item with some variations, including even slight variations. Since items are immutable, each item is distinct even if there is only has a minor change between two items. Taken together, minor changes to an item may be considered a time series chain of the same item instead of distinctly different artifacts. While each copy is still immutable, the concept of versioning allows operators to manage a chain of items as a single reference with a pointer to the correct version in the series. This convention greatly assists operators in understanding systems. It also makes it easier for the systems to manage their own composition because a collection of immutable items can be greatly simplified by not allowing multiple versions of the same item. In that case, the item provides a unique index, e.g., name or key, that persists regardless of the item's version. Both the item name and version may be used to identify the correct immutable instance.

FIG. 1 is a simplified block diagram of a federation 100 implemented according to one embodiment of the present disclosure. The federation 100 includes multiple data centers 102 and may also include a file server (FS) 104 coupled together via a communication network 190, although the communication network 190 itself is not considered part of the federation 100. The network 190 may include localized portions, such as local area networks (LANs) or the like, but generally also includes a significantly wider portion, such as a regional or global computer network including the internet or the like, which is used for interfacing local and remote data centers 102 and the FS 104. The FS 104 and each of the data centers 102 may be located at any one or more of several different site configurations, such as, for example, a home, an automobile, a ship, a space craft, a cell tower, an office or office building, a retail location, a computer center or building, etc. A dotted line between the network 190 and the FS 104 and between the network 190 and each of the data centers 102 represents an interface to the network 190. Each interface may be tightly or loosely coupled, may be continuous or intermittent, and may include any combination of wireless or wired configurations.

The federation 100 is illustrated to include many data servers 102 in which ellipses generally represent that the federation 100 may include many more data servers than that shown, such as numbering in the hundreds or even thousands or more. It is noted, however, that a distributed edge configuration management implemented according to embodiments described herein may be implemented on any one or more of the data centers 102. The FS 104 may also be configured as a data center, but generally operates to enable access by each of the data centers 102 to each other and to a central configuration repository storage 108 coupled to the FS 104, in which the configuration repository storage 108 stores a library of one or more versions of composable and immutable content as further described herein.

The federation 100 incorporates distributed edge configuration management which allows operators of highly distributed autonomous edge data center sites to operate both autonomously and under hierarchical federated control. Any one or more up to all of the data centers 102 may operate as an "edge" data center that may be isolated from the network 190 from time to time. Such intermittent connectivity would otherwise isolate edge locations from conventional infrastructure management services. An edge location may have limited network bandwidth or latency, and may have limited physical access. It is noted that limited or intermittent network access is not a prerequisite of distributed edge configuration management as described herein; instead, distributed edge configuration management enables consistent and repeatable management regardless of connectivity status. Many of the data centers 102, for example, may operate with very high bandwidth and low latency most if not all of the time. Data center management should nonetheless be consistent and repeatable across the entire federation 100. A central element of the distributed configuration model described herein is the use of composable and immutable configuration packages that can be widely distributed with or without direct or consistent connectivity.

Figure 2:
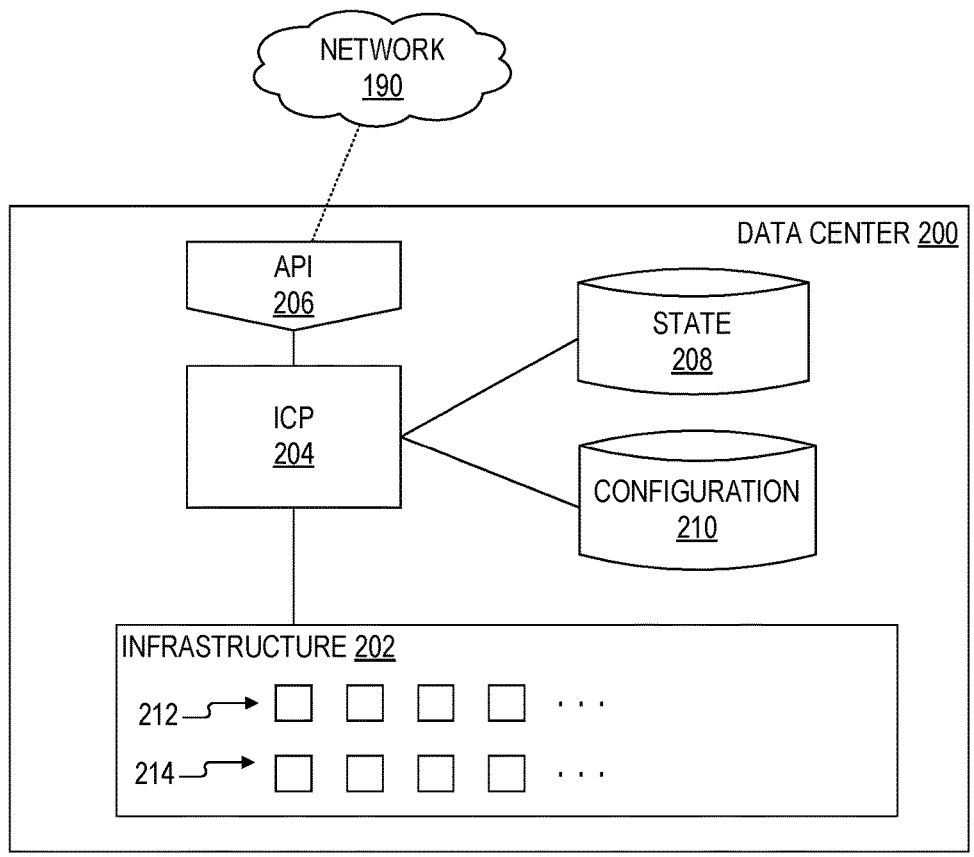
FIG. 2 is a simplified block diagram of a data center implemented according to one embodiment of the present disclosure, in which any one or more up to all of the data centers of FIG. 1 may be implemented in the same or similar manner as the data center of FIG. 2.

FIG. 2 is a simplified block diagram of a data center 200 implemented according to one embodiment of the present disclosure, in which any one or more up to all of the data centers 102 of FIG. 1 may be implemented in the same or similar manner as the data center 200. The data center 200 includes a local infrastructure 202, an infrastructure configuration platform (ICP) 204 (which may also be referred to as an "endpoint"), an Application Programming Interface (API) 206 for interfacing the network 190, a state storage 208, and a configuration storage 210. Although the storages 208 and 210 are shown separately, they may be part of a larger storage system of storages. The storages 208 and 210 may each include any combination of data storage devices, such as disk drives (including magnetic disk drives, solid state drives, optical drives, etc.) used for long term storage of data and information. Although the data center 200 is shown including only one infrastructure 202 and ICP 204, the data center 200 may support multiple infrastructures, ICPs, and storage devices. Each ICP described herein, including the ICP 204, incorporates a configuration processor and other resources for managing a corresponding infrastructure.

The API 206, which is exposed by the ICP 204 to external devices via the network 190, enables communication with external computers and resources including other data centers and the FS 104 and its resources. These external interactions include commands that are requests to change the configuration or state of the infrastructure 202. Requests or commands may be initiated by a user directly or via a Command Line Interface (CLI), by a Web client, or by any other client or user. The interactions may also be initiated by other systems on behalf of a user. Although not explicitly shown for ICPs shown and described herein, it is understood that each ICP includes a corresponding API (similar to the API 206) for enabling communications with other data centers (e.g., any of the other data centers 102), devices, servers, etc., interfaced via the network 190.

The infrastructure 202 incorporates one or more physical and virtual computer servers 212 and other physical and virtual computational resources 214 for performing the functions and services of the data center 200, such as network routers, network switches, firewalls, storage systems (e.g., magnetic, optical or electrical disk drives or storage devices and the like) and other commodity components such as application delivery controllers or the like. The computational resources may include virtual server applications or the like that may be accessed locally or remotely.

The ICP 204, which is a local service or process or the like, operates as an infrastructure controller to manage the configuration and operating functions of the infrastructure 202. Although the ICP 204 may be located on or otherwise executed by a server of the infrastructure 204, the ICP 204 may also be executed by a separate or even external server or processor to maintain control in the event one or more of the devices of the infrastructure 204 becomes unavailable, such as being shut down or reset or the like.

The state storage 208 stores a description of the state of the infrastructure 202. The state information describes the infrastructure 202 and status of operation, such as specific site identification information, names and identifiers of individual servers, status of operation of the servers, identification and status of applications running (or executing) on the servers, network access information, etc. The state information is dynamic and constantly changing during operation and thus generally comprises read/write (R/W) information.

The configuration storage 210 stores configuration information including instruction sets, such as operational programs, automated code, automated scripts, programs, and applications and the like, which are executed by the ICP 204 for setting up, configuring, and reconfiguring the infrastructure 202 for desired operation. The instruction sets are organized as a hierarchy of tasks for establishing how the infrastructure 202 should respond to stimulus. Examples of configuration information for any one or more of the computer servers of the infrastructure 202 include installed versions of operating programs (OS), application programs, software, etc., the method of accessing or connecting to the network 190, storage layout including storage amount, applicable BIOS version, etc.

Figure 3:
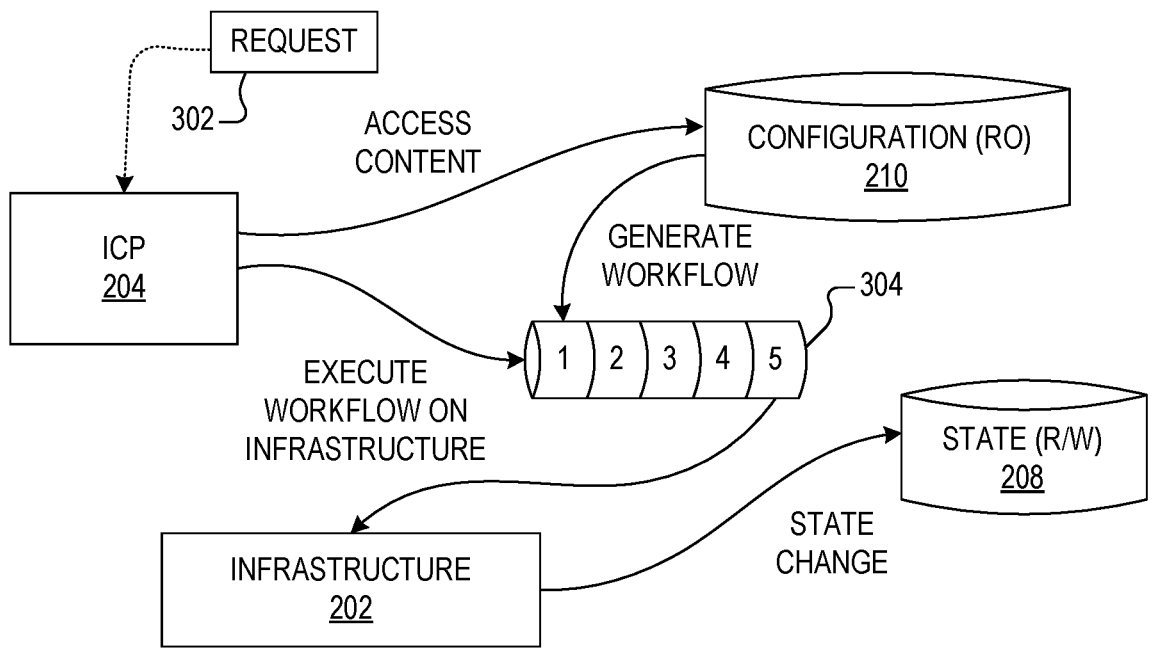
FIG. 3 is a figurative block diagram illustrating an intent-based operation that is performed in response to a request according to one embodiment of the present disclosure.

FIG. 3 is a figurative block diagram illustrating an intent-based operation that is performed in response to a request 302 according to one embodiment of the present disclosure. The request 302 may be generated locally or provided from the network 190 via the API 206 (not shown in FIG. 3) and received by the ICP 204. It is understood that each ICP instance includes an API or other network interface. The ICP 204 accesses read-only (RO) configuration information from the configuration storage 210 and generates a corresponding workflow 304. The ICP 204 performs or executes the workflow 304 on the infrastructure 202 to effectuate a state change to update the state information stored in the state storage 208. One objective of the ICP 204 is to enable operators to make API requests or the like to achieve a target state with the expectation that the ICP 204 make a series of intermediate state changes in the form of the workflow 304 to effectuate the target state of the infrastructure 202. This operational model is achieved when the ICP 204 accesses and executes an advanced configuration system that includes a wide range of automation, templates and scripts used to advance the infrastructure 202 between states. Given the right target state, the ICP 204 may be fully autonomous and not require additional external inputs.

Figure 4:
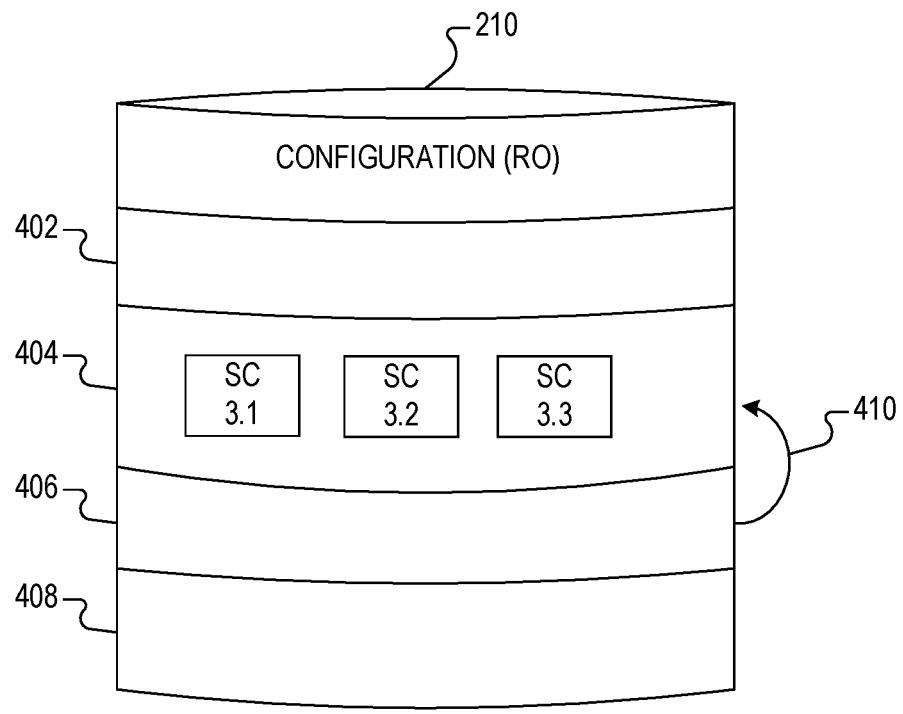
FIG. 4 is a simplified diagram of the configuration information stored in the configuration storage of the data center of FIG. 2 according to one embodiment of the present disclosure.

FIG. 4 is a simplified diagram of the configuration information stored in the configuration storage 210 of the data center 200 according to one embodiment of the present disclosure. The configuration information may be decomposed on modular layers 402, 404, 406, and 408 (402-408) of the configuration storage 210. Although only 4 such modular layers are shown, it is understood that the configuration storage 210 may be decomposed into any number of layers less than or greater than four. Each of the layers 402-408 can be managed independently from each other such that operators can add, update or remove modular layers 402-408 to modify the configuration information. One or more dependencies may be defined between modular layers. As shown, for example, a dependency link 410 indicates dependency of layer 406 on layer 404. These dependencies may be simple or complex having a range of versions or other properties.

In addition to being modular, layers may have to interact with the configuration storage 210 in different ways. For example, layer 402 may allow updates to configuration items stored within while layer 404 may be immutable. As previously described, the term "immutable" means that the information is indivisible in that it is treated as a unit or as a whole when installed. An immutable unit may not be updated without changing its identity. An immutable unit is only changed by either being deleted in whole or replaced in its entirety by a different unit. Having both immutable and composable configuration layers allows operators to guarantee the state of the configuration information stored in the configuration storage 210 at any time. Generally, components of the layer 404 are immutable to the ICP 204, while the entire layer 404 itself may be updated or deleted as a unit or as a whole rather than in part.

Layer 404 may further be composed of configuration subcomponents (SC) 3.1, 3.2, and 3.3 as shown. Although only three subcomponents are shown, any number of subcomponents is contemplated in which the number is limited only by the available memory space of the layer 404. Each of the subcomponents SC 3.1-3.3 may further include one or more scripts or code modules for performing corresponding functions. Generally, the configuration information may be in the form of infrastructure as code (IaC), which is the process of managing and provisioning computer data centers through machine-readable definition files, rather than physical hardware configuration or interactive configuration tools. The definitions may use scripts or declarative definitions or according to declarative approaches and the like.

Figure 5:
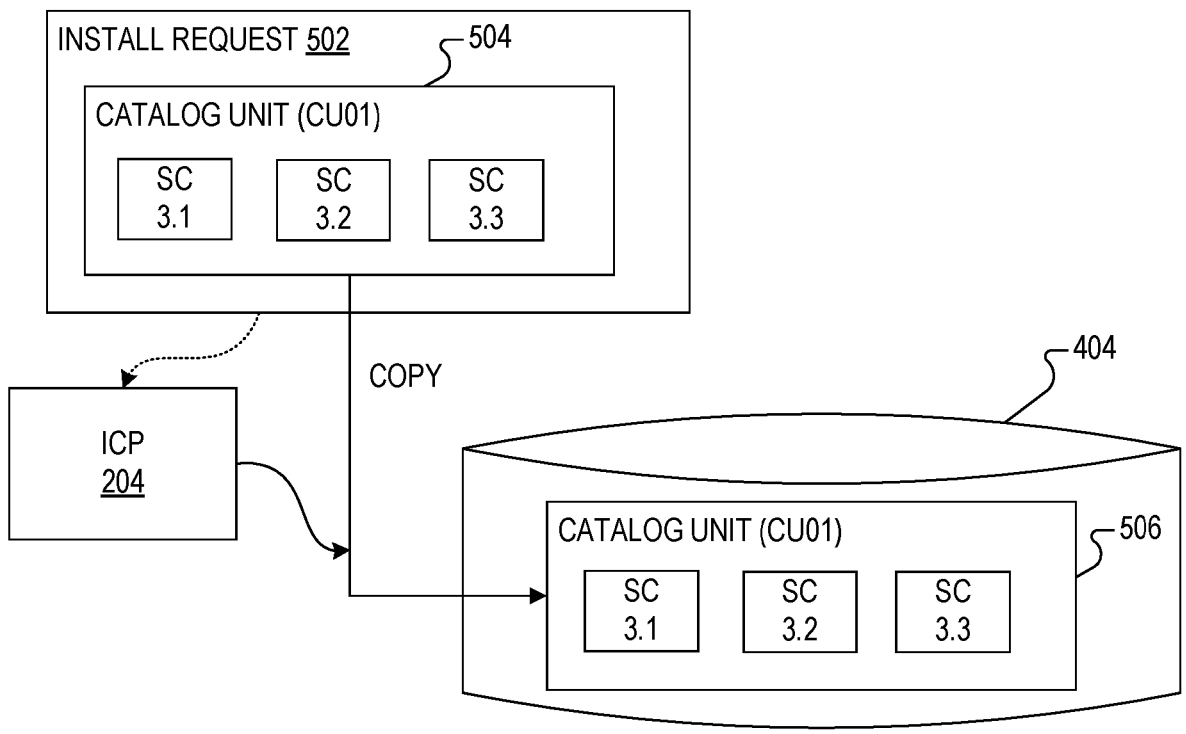
FIG. 5 is a simplified figurative diagram illustrating catalog units and operation of a request to install configuration information into the configuration storage of FIG. 2 according to one embodiment of the present disclosure.

FIG. 5 is a simplified figurative diagram illustrating catalog units and operation of a request to install configuration information into the configuration storage 210 according to one embodiment of the present disclosure. The subcomponents SC 3.1-3.3 may be authored and managed externally, such as at any one of the data centers 102 or at the FS 104. The subcomponents SC 3.1-3.3 may be updated directly in the writable configuration layer 404; such direct approach, however, may make it difficult to manage the system due to the number of configuration artifacts. Instead, the subcomponents may be bundled into a catalog unit 504 with a particular identity, shown as CU01. As described further herein, the catalog unit CU01 may be replaced by a new catalog unit or an updated version of the same catalog unit. The new or updated version is given a different identity even when only one of the subcomponents has been modified and even when the modification is relatively minor.

It is noted that any given catalog unit may include a single subcomponent (or even zero subcomponents in the case of a "null" catalog unit) up to any number of subcomponents and is not limited to three subcomponents as illustrated. In addition, subcomponents may stand alone and need not be grouped into catalog units.

An install request 502 for installing the catalog unit 504 is received by the ICP 204. The ICP 204 accesses the catalog unit 504 from the request and copies it into the appropriate location within the configuration storage 210. As shown, the catalog unit 504 is copied into and installed within the layer 404 to become installed catalog unit 506. The installed catalog unit 506 contains a fixed version of the subcomponents SC 3.1-3.3 and is managed as a single unit by the ICP 204. The installed catalog unit 506 retains the same identity CU01 as the original catalog unit 504, and each are separate instances of the same identical catalog unit. Since the installed catalog unit 506 is considered immutable, operators can ensure that configuration components are not modified within the ICP context. This provides a high degree of security, repeatability and control.

Figure 6:
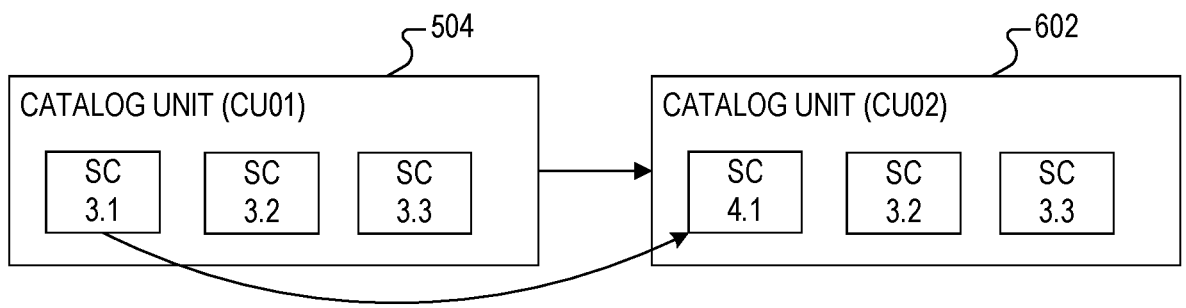
FIG. 6 is a simplified block diagram illustrating updating a catalog unit according to one embodiment of the present disclosure.

FIG. 6 is a simplified block diagram illustrating updating a catalog unit according to one embodiment of the present disclosure. In this example, the catalog unit 504 with identity CU01 is updated to a new catalog unit 604 with a new identity CU02. Such update may occur locally at the data center 200, but may also be performed externally at a separate data center (not shown) used for procuring catalog updates. In this case, the SC 3.1 of the catalog unit 504 is updated to a SC 4.1, whereas the SCs 3.2 and 3.3 remain unmodified. Since even minor changes can have profound impacts on ICP operation, both subcomponents and catalog units may be managed as discrete artifacts. One possible option is to use a source code control system to provide reliable copy. In this case, rather than making single changes, operators can create new catalog unit 602 as a new version of the catalog unit 504 which includes SC 4.1 as a replacement for SC 3.1. Although subcomponents 3.2 and 3.3 have not changed in this example, they are still needed as an integral part of the updated catalog unit 602. The changed identity from CU01 to CU02 enables users and operators to distinguish between the different catalog units.

With reference back to FIG. 5, although there is a distinction made between the different instances of a catalog unit, such as the uninstalled catalog unit 504 versus the installed catalog unit 506, the identity is the same. If a change was allowed to SC 3.1 while installed in layer 404 of the configuration storage 210, even if a small or seemingly insignificant change, then the degree of security, repeatability and control may begin to degrade if not recognized and identified as a separate catalog unit. For example, even incremental small changes over time may cause a drift or a difference in operation as compared to the original installation. Although a change may be considered insignificant at a given data center, similar content installed at two or more different data centers may drift apart over time in a significant manner compromising the security, repeatability and control in the federation 100 as a whole.

As shown in FIG. 6, changes are enabled to improve operation over time, so long as the immutability of modified content is preserved. Thus, even a small change to SC 3.1 of the catalog unit 504 creates a new SC 4.1, and replacing SC 3.1 with SC 4.1 in the original catalog unit creates a new catalog unit 602 with an updated identity CU02. Thus, the identity of the updated catalog unit is changed from CU01 to CU02 to enable distinction between different catalog units. Such changes may be made and tested remotely or off-site, and once procured provides a new or updated catalog unit ready to be installed to replace the original catalog unit.

Figure 7:
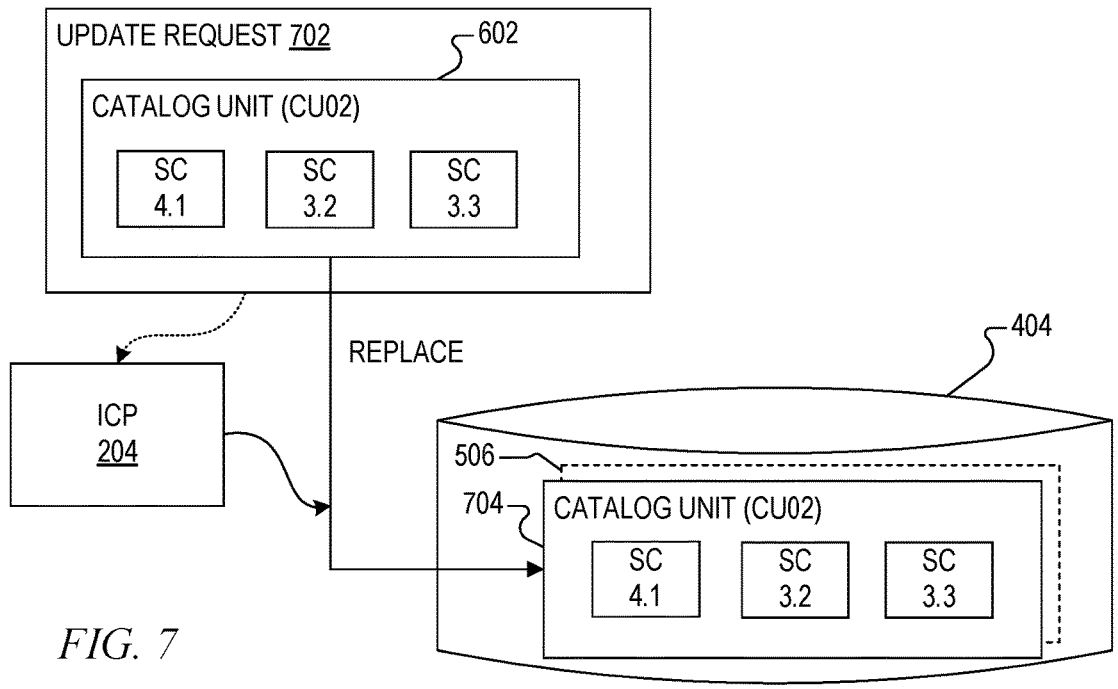
FIG. 7 is a simplified figurative diagram illustrating catalog units and operation of a request to update configuration information into the configuration storage of FIG. 2 according to one embodiment of the present disclosure.

FIG. 7 is a simplified figurative diagram illustrating catalog units and operation of a request to update configuration information into the configuration storage 210 according to one embodiment of the present disclosure. An update request 702 for updating the installed catalog unit 506 is received by the ICP 204. The ICP 204 accesses the catalog unit 602 from the request and copies it into the layer 404 thereby replacing the installed catalog unit 506 as newly installed catalog unit 704. In this manner, after the new catalog unit 602 is assembled and identified as updated catalog unit CU02, it can be used to atomically update layer 404 of the configuration storage 210. If desired, the updated catalog unit 602 with new or updated identify CU02 may also be stored in the configuration repository 108 of the FS 104 or any other similar artifact storage system. It is noted that the configuration repository 108 may retain a copy of the replaced catalog unit CU01 especially when still being used by other data centers in the federation 100. Centralized storage of updated catalogs enables updates to be shared among other data centers in a given federation, or at least provide the ability to better track differences in installation between different data centers of the federation.

Figure 8:
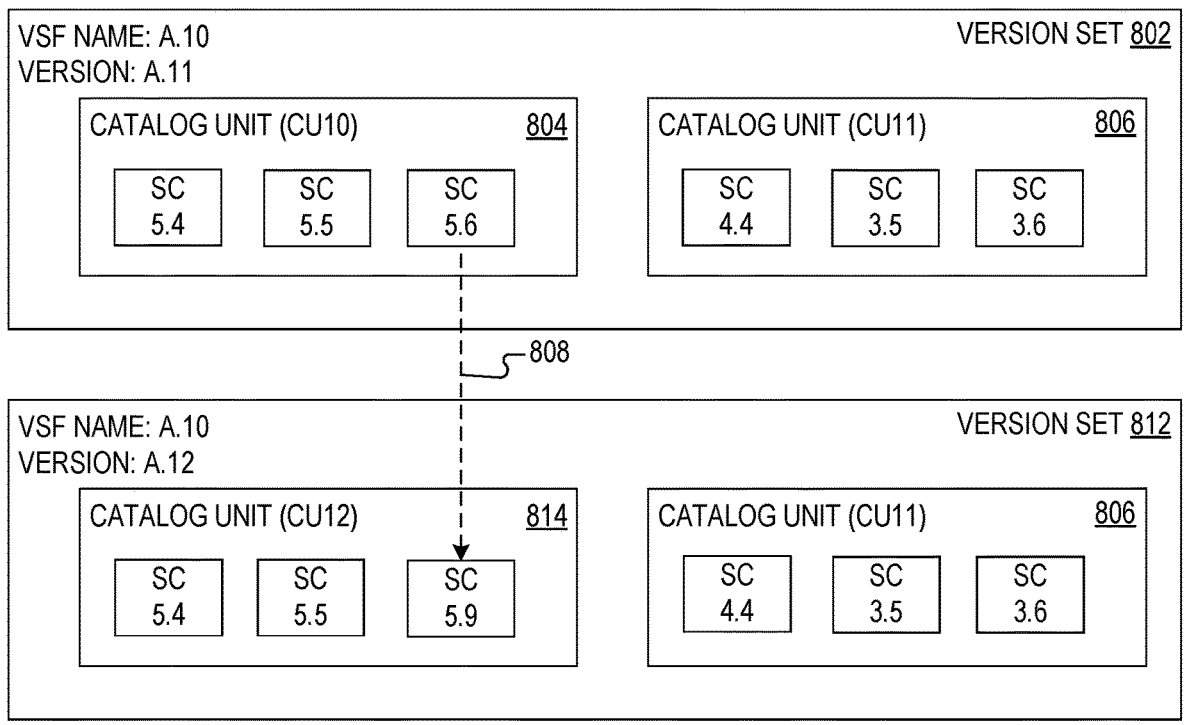
FIG. 8 is a simplified block diagram illustrating catalog units assembled into version sets and corresponding distinctive identification according to one embodiment of the present disclosure.

FIG. 8 is a simplified block diagram illustrating catalog units assembled into version sets and corresponding distinctive identification according to one embodiment of the present disclosure. A first version set 802 includes a catalog unit 804 with identity CU10 and another catalog unit 806 with identity CU11. The catalog unit 804 includes subcomponents SC 5.4, 5.5, and 5.6 and the catalog unit 806 includes subcomponents SC 4.4, 3.5, and 3.6. A second version set 812 includes a catalog unit 814 with identity CU12 and the catalog unit 806 with identity CU11. The catalog unit 814 includes subcomponents SC 5.4, 5.5, and 5.9. An arrow 808 indicates that the only difference between the catalog unit 804 and the catalog unit 814 is that SC 5.6 has been replaced by SC 5.9. The catalog unit 806 is identical between the two version sets 802 and 812 with the same identity CU11.

Any given version set may include a single catalog unit (or even zero catalog units in the case of a "null" version set) up to any number of catalog units and is not limited to two catalog units as illustrated. The version sets 802 and 812 illustrate how multiple catalog units may be combined into a single version set, and how a sequence of related version sets can be created. The version set 812 is distinct from the version set 802 because it includes the updated catalog unit 814 (which may be an updated version of catalog unit 804). The catalog unit 814 is distinct from the catalog unit 804 because SC 5.6 has been replaced with SC 5.9 and given a new identity. The component (or subcomponent), catalog unit and version set grouping are used to illustrate changed artifacts regardless of how many items have changed and even when only one item has changed. Any given change can be minimal or more substantial.

Since the only difference between the version sets 802 and 812 is a subcomponent version, they may be considered as different versions of the same version set family (VSF) named A.10. The concept of versioning allows operators to view changes to system configuration as a time sequence of changes. For example, both version sets 802 and 812 are illustrated as being members of the same version set family VSF A.10 for management tracking. Each version set may also include a version identifier to distinguish between different versions within the same VSF. Version set 802 is identified as version A.11 and version set 812 is identified as version A.12. Thus, version set 802 is version A.11 of VSF A.10 and version set 812 is version A.12 of VSF A.10, in which operators may reference the version identifiers A.11 and A.12 to distinguish between the different versions of VSF A.10.

Figure 9:
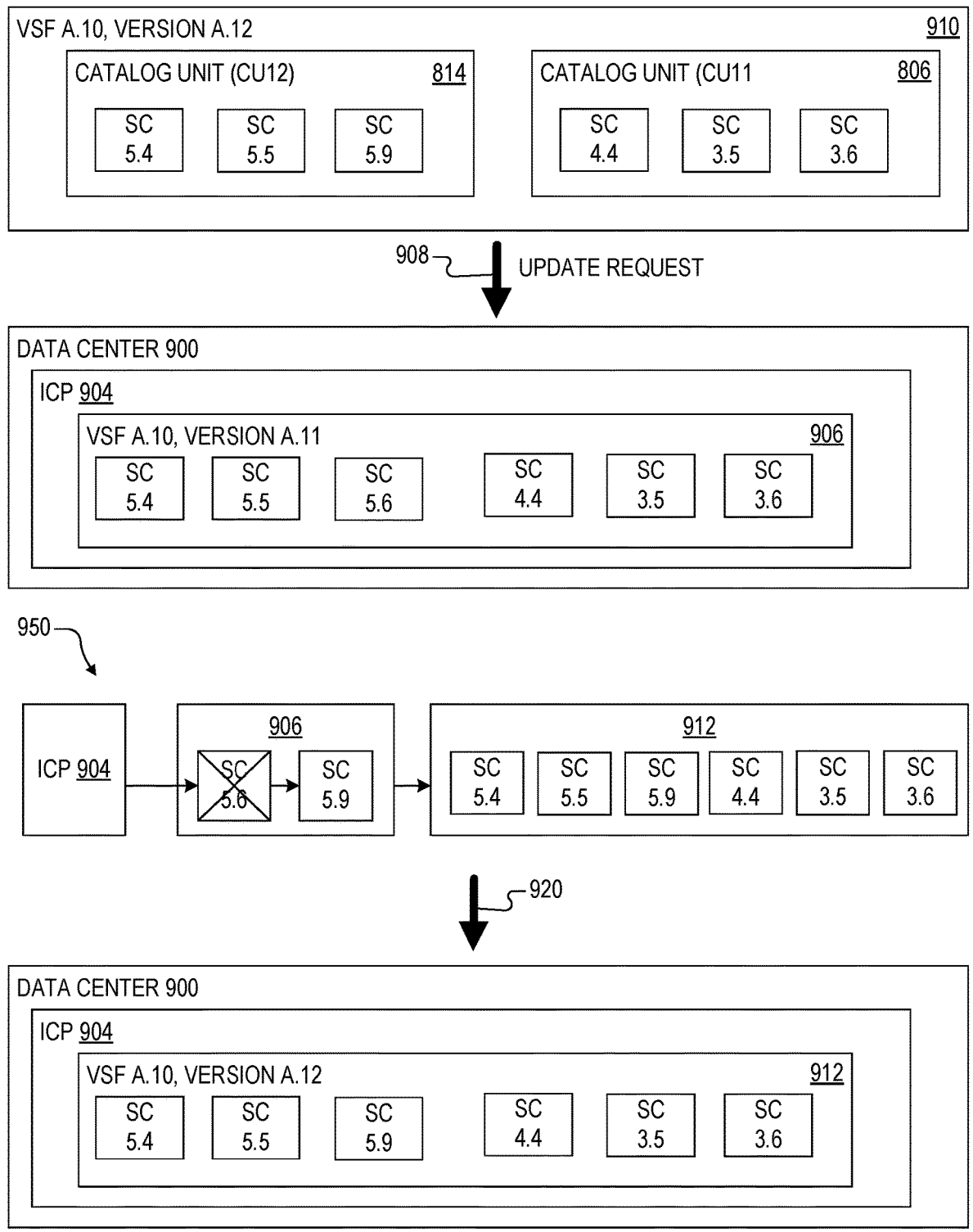
FIG. 9 is a simplified block diagram illustrating updating a version set according to one embodiment of the present disclosure in which the version set is currently installed at a data center of the federation of FIG. 1.

FIG. 9 is a simplified block diagram illustrating updating a version set 906 currently installed at a data center 900 of the federation 100 according to one embodiment of the present disclosure. The data center 900 includes ICP 904 shown operating the version set 906, which is version A.11 of VSF A.10. It is noted that the version set 906 may be installed on a local configuration store similar to the configuration store 210 (not shown in the simplified illustration). The catalog units are not separately identified in the data center 900 although the identifiers may be stored by the ICP 904.

An update request 908 (local or external) is received incorporating a version set 910, which is a copy of the version set 812 or version A.12 of VSF A.10 including catalog units 814 and 806. As shown at 950, rather than installing the entire version set 910 to replace the installed version set 906, the ICP 905 merely replaces subcomponent SC 5.6 with SC 5.9 to form installed version set 912. When each component is distinct, an ICP can determine exactly which components need to be updated when the operator provides a higher level version set or catalog unit. Arrow 920 shows the resulting transformation in which the data center 900 includes ICP 904 operating the updated version set 912, which is an installed instance of the version set 910.

In this manner, treating version sets as composed units rather than atomic units has the additional benefit of minimizing unnecessary subcomponent changes. If a version set only changes a single subcomponent, then the update can be limited to just that one change so long as the name and corresponding version identifiers are updated accordingly. Note, for example, that the version set 912 becomes updated version A.12 of VSF A.10. Although not specifically shown, the ICP 904 also updates the corresponding catalog unit identifier(s) if applicable.

Figure 10:
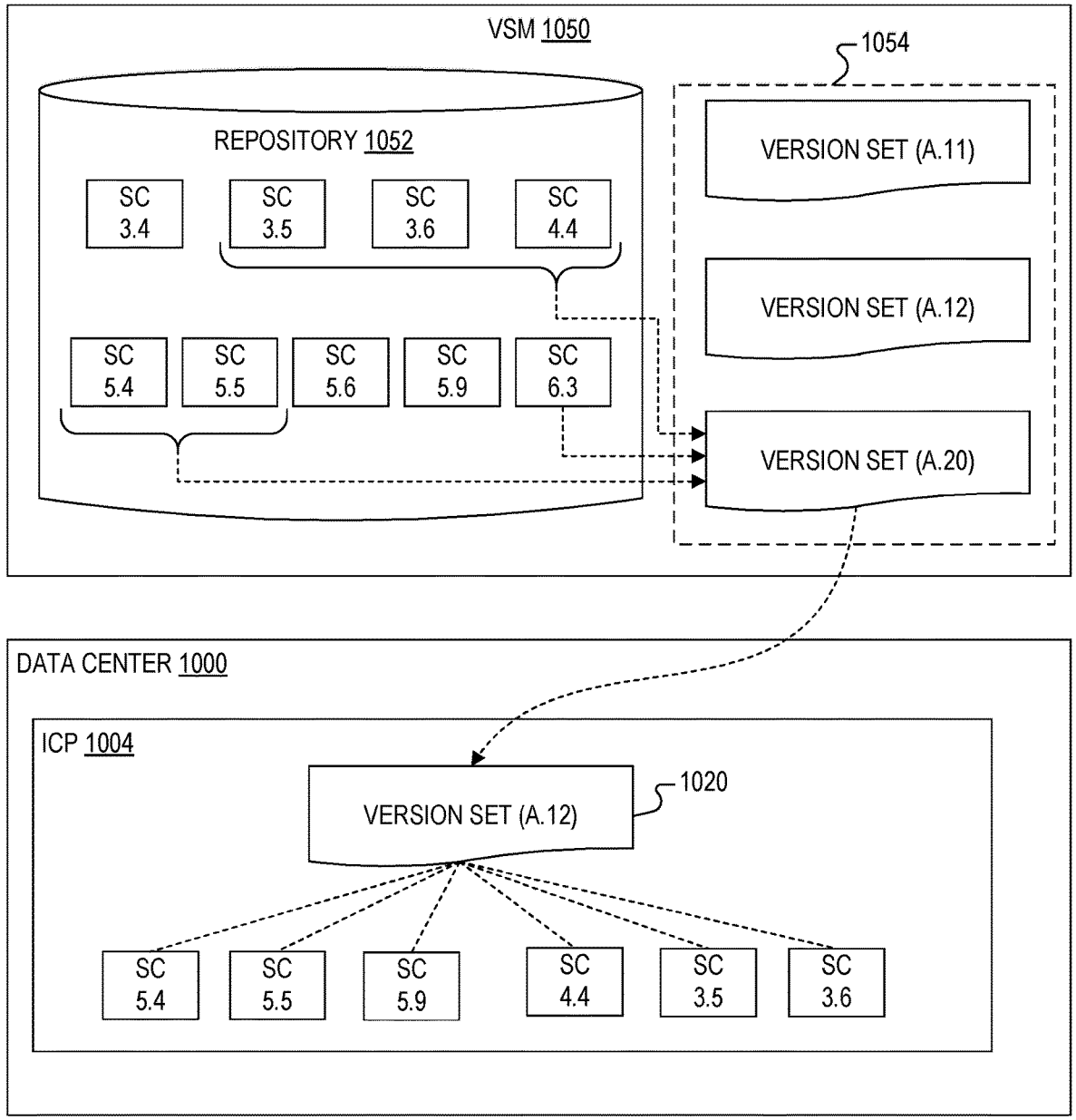
FIG. 10 is a simplified block diagram of a version set manager (VSM) implemented according to one embodiment of the present disclosure, in which a VSM may be used to manage and update a version set on at least one data center of the federation of FIG. 1.

FIG. 10 is a simplified block diagram of a version set manager (VSM) 1050 implemented according to one embodiment of the present disclosure, in which a VSM may be used to manage and update a version set on at least one data center 102 of the federation 100. As shown, the VSM 1050 manages the installed version set 1020 used by an ICP 1004 at a data center 1000 of the federation 100, in which the version set 1020 is identified as version A.12. The VSM 1050 maintains a repository 1052 of subcomponents shown as SC 3.4, 3.5, 3.6, 4.4, 5.4, 5.5, 5.6, 5.9, and 6.3. The VSM 1050 also includes a set of version sets 1054 including one or more version sets that are based on groupings of the subcomponents of the repository 1052. The set of version sets 1054 includes version sets with version identifiers A.11, A.12, and A.20, each including subcomponents of the repository 1052. Versions A.11 and A.12 may be different version of the VSF A.10 as shown in FIG. 8 with corresponding subcomponents from the repository 1052. For simplification, these may be referred to as version set A.11 and version set A.12, respectively.

Users or operators may use the subcomponents in the repository 1052, which includes a newly created SC 6.3, to create a version set A.20 as a new version set within the set of version sets 1054. Dashed lines illustrate that the version set A.20 includes subcomponents SC 3.5, 3.6, 4.4, 5.4, 5.5, and 6.3. Essentially, the version set A.20 may be an updated version of version set A.12 in which SC 5.9 is replaced by SC 6.3.

The ICP 1004 operates using an installed version set 1020 or version set A.12. The VSM 1050 is able to use the API (not shown) or other network interface of the ICP 1004 to check the installed catalog items and corresponding subcomponents. If a difference is found, then the VSM 1050 may request that the ICP 1004 make the indicated changes. There are many different triggers that may be used for the ICP 1004 to update the configuration automation. One trigger approach is an external operator or system pushing updates into the ICP 1004 from remote data centers 102 or the FS 104 of the federation 100. Another trigger approach is to configure the ICP 1004 to poll for changes against a registry or the like or to listen for events about updates.

Regardless of the triggering mechanism, once triggered the fundamental atomic catalog item change process remains the same or substantially similar. In one embodiment, the VSM 1050 sends an update request including the version set A.20, and the ICP 1004 replaces installed version set A.12 with the updated version set A.20. In another embodiment, the ICP 1004 replaces SC 5.9 with SC 6.3 and updates the version set number and name to reflect the updated version set. As new subcomponents are provided or made available, the VSM 1050 may generate updated version sets and update the data center 1000 accordingly.

Figure 11:
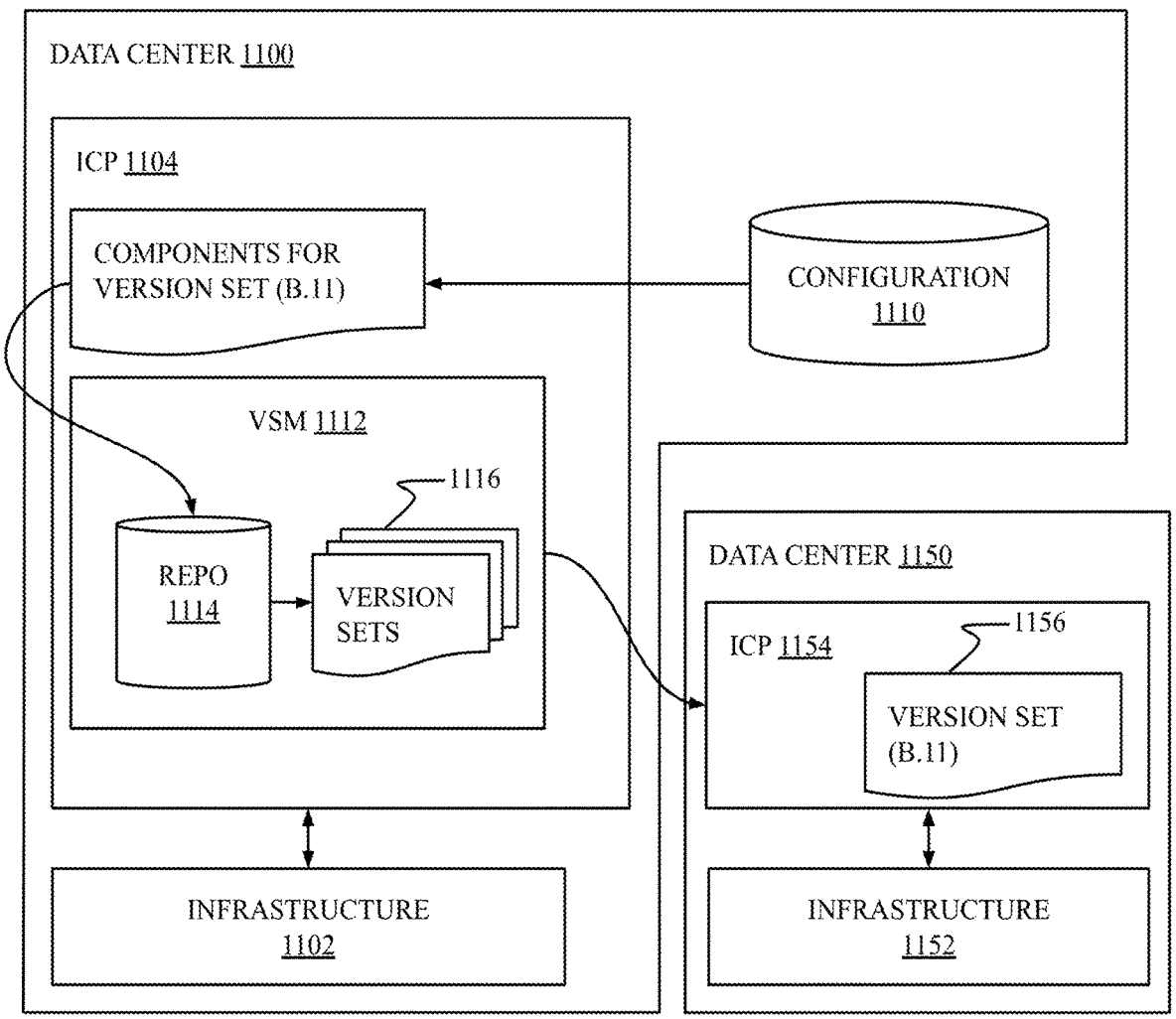
FIG. 11 is a simplified block diagram of another ICP configuration that integrates version set manager (VSM) functions according to one embodiment of the present disclosure.

FIG. 11 is a simplified block diagram of another ICP configuration that integrates version set manager (VSM) functions according to one embodiment of the present disclosure. A first data center 1100 of the federation 100 includes an infrastructure 1102, an ICP 1104, and a configuration storage 1110. A second data center 1150 of the federation 100 includes an infrastructure 1152 and an ICP 1154 executing a version set B.11. Although not explicitly shown, additional components may be included in the data center 1100, such as an API and a state storage in a similar manner as previously described. Similarly, the data center 1150 may also include an API, a state storage and a configuration storage in a similar manner previously described.

The ICP 1104 incorporates a VSM 1112 including a repository 1114 of subcomponents and one or more corresponding version sets in a set of version sets 1116. In this case, components of a version set can be replicated from the configuration storage 1110 into the repository 1114 of the VSM 1112. When subcomponents are immutable, configuration storage 1110 and the repository 1114 may be the same storage. The set of version sets 1116 includes a copy of a version set B.11. In this scenario, the components for the version set B.11 are already in use by the ICP 1154 of the data center 1150, shown at 1156. Nonetheless, the components of the version set B.11 may be staged but not immediately in use by the ICP 1154. This allows operators to stage changes in a local environment before making changes to an ICP.

Since the integrated VSM 1112 is fully operational, it can make changes to the version set used by another ICP, such as the ICP 1154 of the data center 1150. The VSM 1112 can instruct the ICP 1154 to use the version set B.11 even when the data center 1150 is remotely located with ICP 1154 managing its own infrastructure 1152. The VSM 1112 of the data center 1100 may operate to manage the version set B.11 of the data center 1150 including updates thereto. Although not explicitly shown, in one embodiment the VSM 1112 may also manage a version set (not shown) in use by the ICP 1104 of the data center 1100. Alternatively, another VSM (not shown) may manage the version set operated by the data center 1100.

Figure 12:
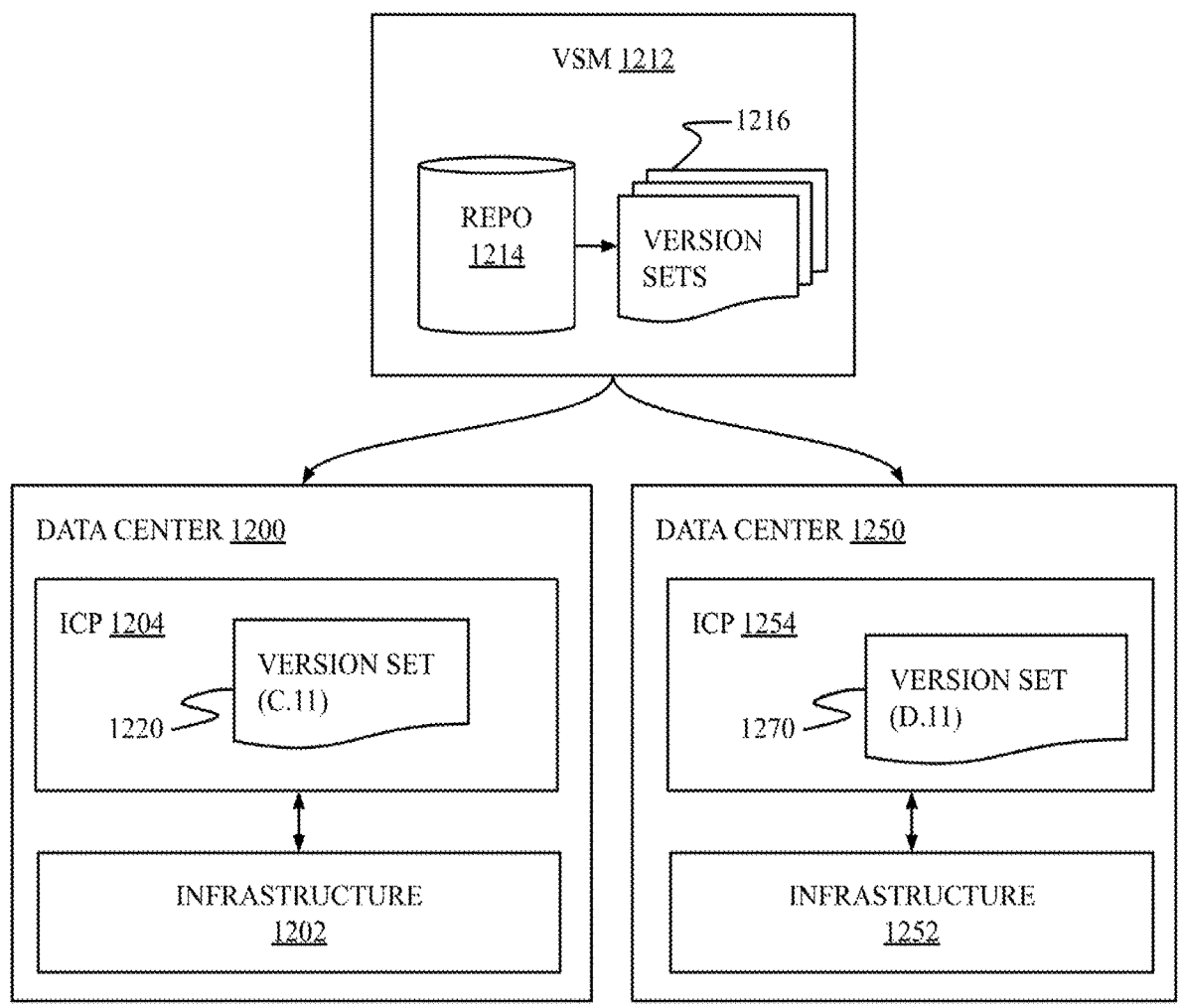
FIG. 12 is a simplified block diagram illustrating a VSM managing multiple ICPs according to one embodiment of the present disclosure.

FIG. 12 is a simplified block diagram illustrating a VSM 1212 managing multiple ICPs according to one embodiment of the present disclosure. In this case, the VSM 1212 manages a first ICP 1204 managing an infrastructure 1202 of a data center 1200 and also manages a second ICP 1254 managing an infrastructure 1252 of a data center 1250. The VSM 1212 may manage any practicable number of ICPs including only one ICP or more than two ICPs. Each of the data centers 1200 and 1250 may be included in the federation 100 and may include state and configuration storage devices as previously described. The VSM 1212 may be operated independently by a server or incorporated within an ICP of yet another data center of the federation 100.

The ICP 1204 operates installed version set 1220 (version C.11) and the ICP 1254 operates installed version set 1270 (version D.11). The VSM 1212 maintains copies of the version sets C.11 and D.11 in the set of version sets 1216 and all of the corresponding subcomponents within the repository 1214. The VSM 1212 may receive and store new subcomponents within the repository 1214 and may generate updated version sets stored in the set of version sets 1216. The VSM 1212 may then update the version sets of the ICPs 1204 and 1254.

Staging version set changes has many practical applications. One application is to be able to use an ICP in an area with intermittent or no external connectivity. In that case, the VSM 1212 allows operators to deliver new configurations using bulk updates like a USB-key or zip file. It may also be helpful when bootstrapping an ICP configuration with a minimal configuration that can be updated once the system has been activated. Yet another application is to stage changes in advance for installation at a later time such as a service window or to optimize network utilization.

Figure 13:
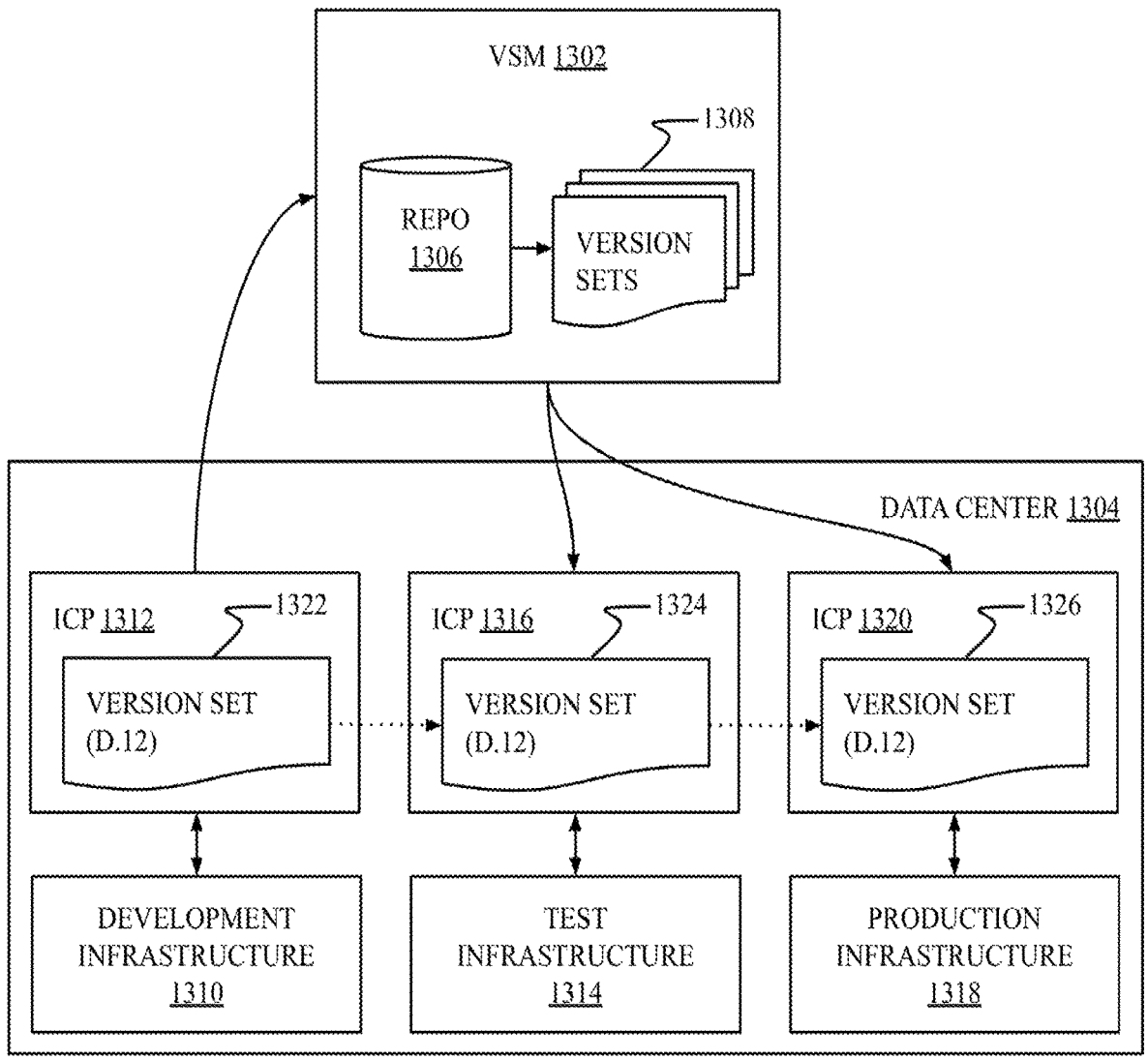
FIG. 13 is a simplified block diagram illustrating a staged deployment pipeline implemented according to one embodiment of the present disclosure.

FIG. 13 is a simplified block diagram illustrating a staged deployment pipeline 1300 implemented according to one embodiment of the present disclosure. The pipeline 1300 is illustrated to include a VSM and a data center 1304 of the federation 100. The VSM 1302 includes a repository 1306 and a set of version sets 1308. The data center 1304 includes a development infrastructure 1310 managed by an ICP 1312, a test infrastructure 1314 managed by an ICP 1316, and a production infrastructure 1318 managed by an ICP 1320. The ICP 1312 operates with an installed version set 1322 (version D.12), the ICP 1316 operates with an installed version set 1324 (version D.12), and the ICP 1320 initially operates with an installed version set 1326 (version D.11). The VSM 1302 manages the version sets of the ICPs 1312, 1316, and 1320.

The version set D.11 is initially used in production, such as by the ICP 1320 and possibly by other ICPs of the data centers 102 in the federation 100. The ICP 1312 develops the updated or new version set D.12 using the development infrastructure 1310. Once the version set D.12 is deemed ready for testing, it is replicated and installed for use by the ICP 1316 using the test infrastructure 1314. The test infrastructure 1314 is used to perform testing operations to verify proper operation of the version set D.12. If testing determines any deficiency or failure of the version set D.12, the development phase using the ICP 1312 and the development infrastructure 1310 is used to make modifications to eliminate the deficiencies or failures. The process may be repeated between development and testing until the version set D.12 is verified by passing the test operations. Then the version set D.12 may be installed for use by the ICP 1320 using the production infrastructure 1318. Although only three main steps are shown, the staged deployment pipeline 1300 may include any number of stages and multiple development, test, and production sites.

Figure 14:
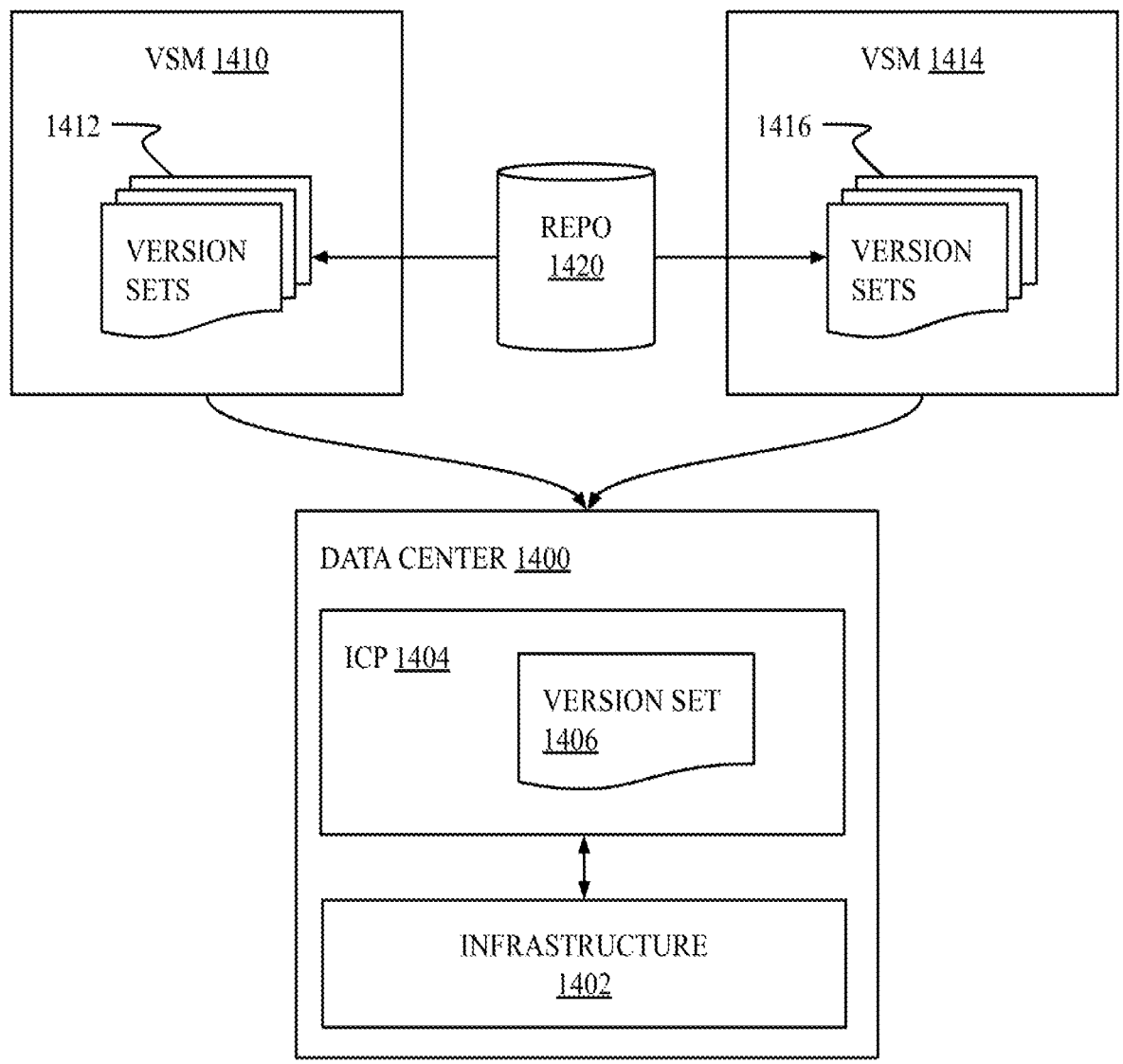
FIG. 14 is a simplified block diagram of a redundant VSM management configuration according to one embodiment of the present disclosure.

FIG. 14 is a simplified block diagram of a redundant VSM management configuration according to one embodiment of the present disclosure. A data center 1400 includes an infrastructure 1402 and an ICP 1404 using installed version set 1406. A first VSM 1410 includes a set of version sets 1412 and a second VSM 1414 includes a set of version sets 1416. In one embodiment, each of the VSMs 1410 and 1414 may include separate repositories. In another embodiment, redundant management may also operate with a shared repository 1420 as shown in FIG. 14. The installed version set 1406 may have been made at the request of either VSM 1410 or 1414, but nonetheless is managed by both. Although the VSMs are shown operating external to the data center 1400, they may be integrated into the data center 1400 or the ICP 1404 in a similar manner previously described.

There are many reasons to implement redundant VSMs in an environment. In some cases, a first VSM (e.g., VSM 1410) may be desired for staging while a second VSM (e.g., VSM 1414) may be used for normal operations. In another embodiment, the VSMs 1410 and 1414 operate as redundant VSMs for disaster recovery or backup purposes. As an example, VSM 1410 may be a primary VSM and the VSM 1414 may be a secondary VSM for managing the version set 1406. In the event of failure of the VSM 1410, the VSM 1414 resumes management control and may even become the new primary VSM. The repository 1420 simplifies operation by avoiding continual updates between duplicate repositories since only one common repository need be maintained.

Figure 15:
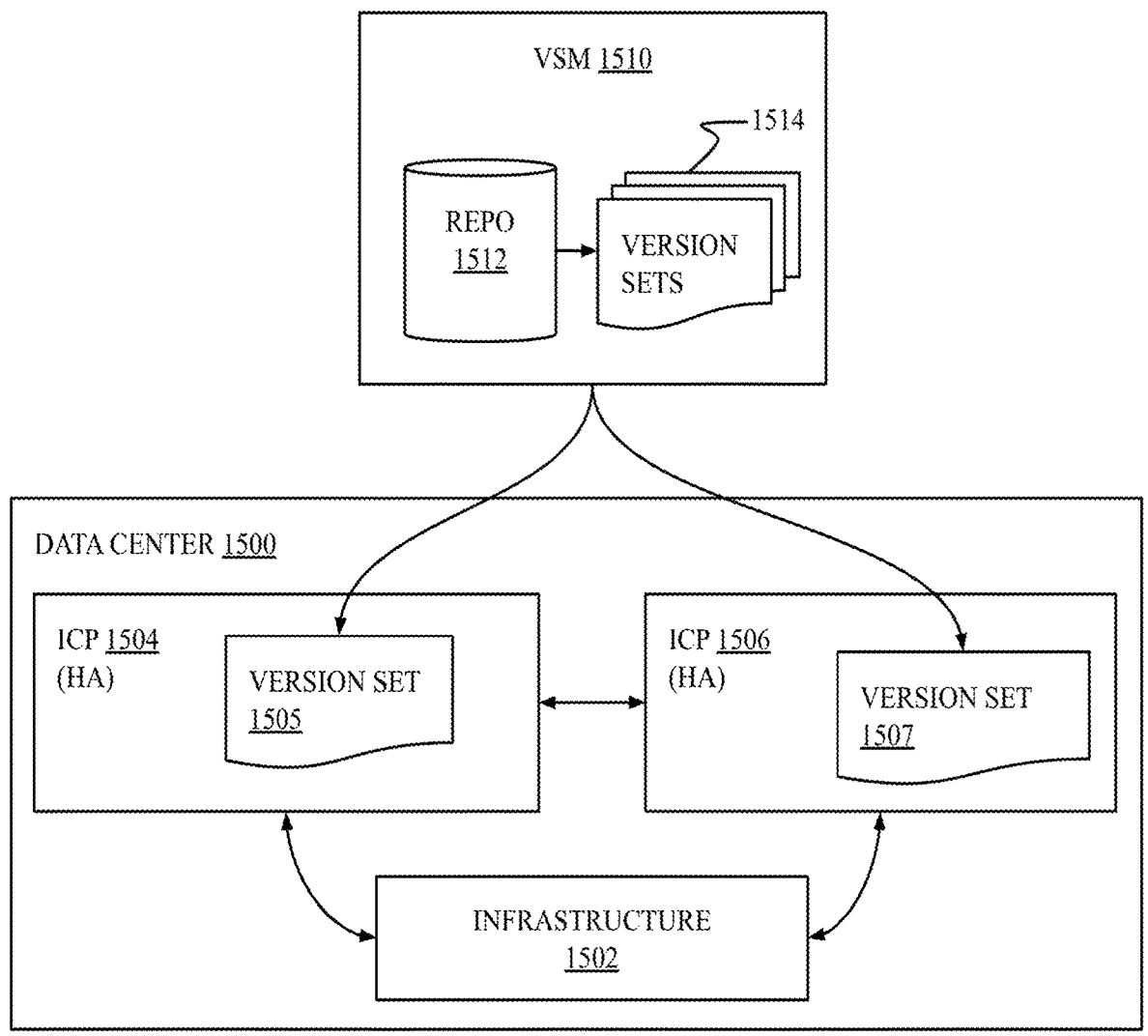
FIG. 15 is a simplified block diagram of a highly available (HA) pair of ICPs according to one embodiment of the present disclosure.

FIG. 15 is a simplified block diagram of a highly available (HA) pair of ICPs according to one embodiment of the present disclosure. A data center 1500 of the federation 100 includes an infrastructure 1502 and a first ICP 1504 using installed version set 1505 and a second ICP 1506 using installed version set 1507. In one embodiment, only one of the ICPs 1504 and 1506 is operative at a time, such that in the event of failure of the operating ICP, the redundant ICP assumes control. An external VSM 1510 includes a repository 1512 and a set of version sets 1514 for managing both of the ICPs 1504 and 1506. The VSM 1510 operates to ensure that the version sets 1505 and 1507 are maintained at the same version level.

Figure 16:
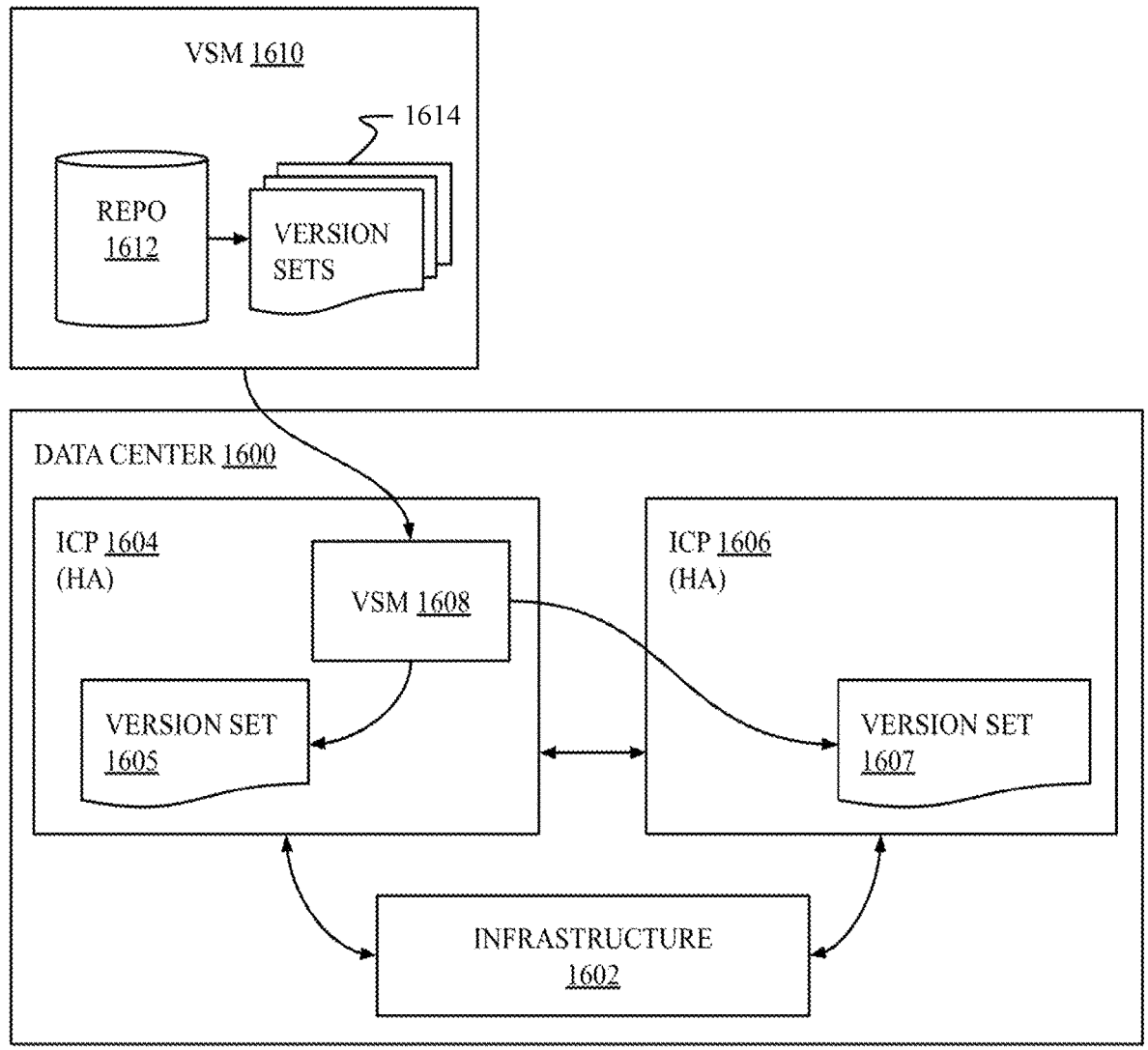
FIG. 16 is a simplified block diagram of another highly available (HA) pair of ICPs according to one embodiment of the present disclosure including an integrated VSM.

FIG. 16 is a simplified block diagram of another highly available (HA) pair of ICPs according to one embodiment of the present disclosure including an integrated VSM. A data center 1600 of the federation 100 includes an infrastructure 1602 and a first ICP 1604 using installed version set 1605 and a second ICP 1606 using installed version set 1607. In a similar manner as described for the data center 1500, in one embodiment only one of the ICPs 1604 and 1606 is operative at a time, such that in the event of failure of the operating ICP, the redundant ICP assumes control. In this case, however, in a similar manner as described for the data center 1100, the ICP 1608 includes an integrated VSM 1608 that maintains both of the version sets 1605 and 1607. The VSM 1608 operates to ensure that the version sets 1605 and 1607 are maintained at the same version level. In addition, an external VSM 1610 includes a repository 1612 and a set of version sets 1614 for maintaining the VSM 1608. Thus, the remote or external VSM 1610 only needs to keep the local VSM 1608 up to date, while the VSM 1608 in turn operates to ensure that the version sets 1605 and 1607 are maintained at the same version level. This reduces the external management load and ensures that local resources are kept up to date.

In an alternative embodiment (not shown), both ICP 1604 and ICP 1606 have integrated VSM capabilities, which ensures a smooth transition between ICP the operative and standby ICPs in the event of a failure. Since the VSM and ICP can sure internal storage, the overhead and synchronization effort is minimal.

Figure 17:
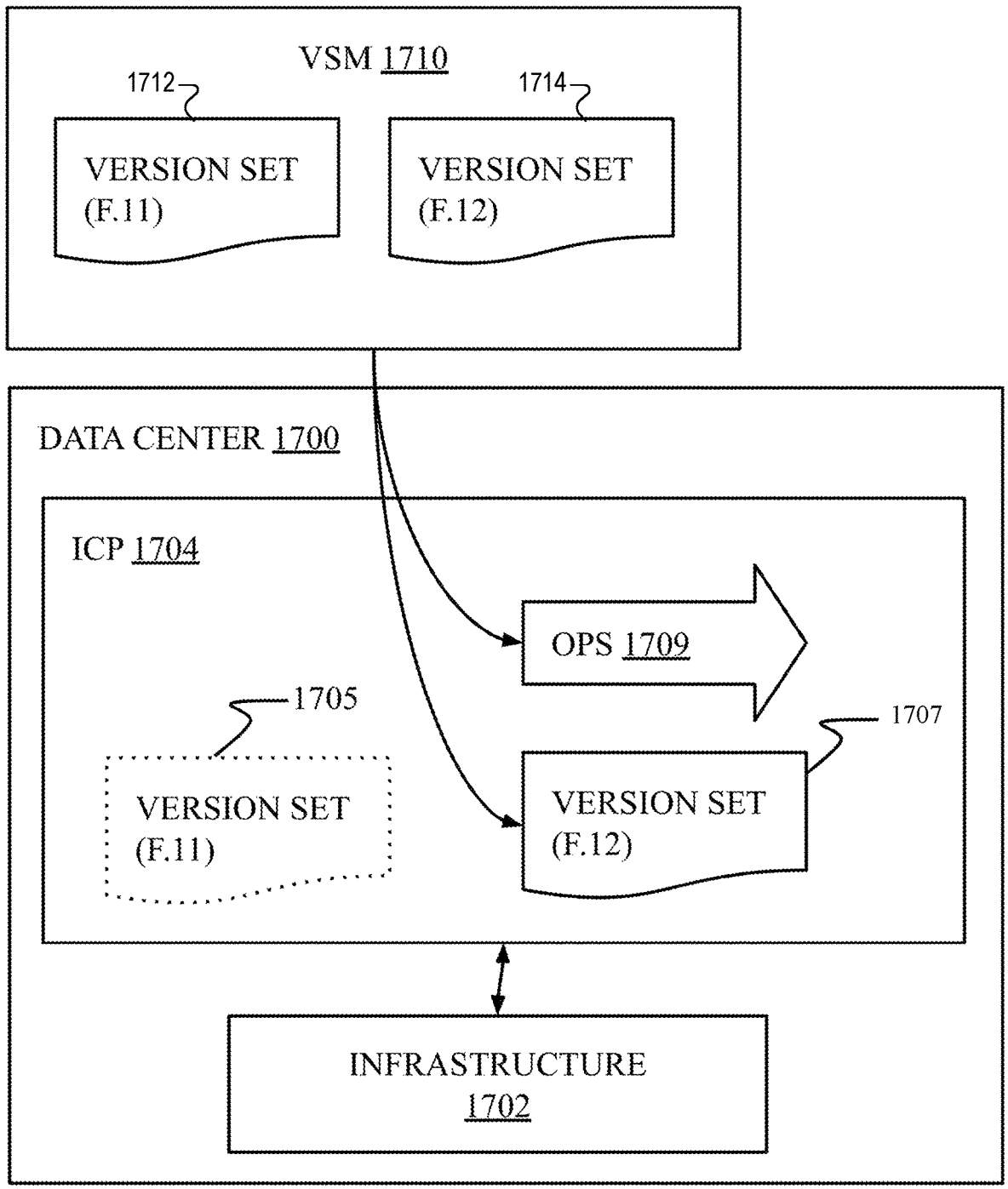
FIG. 17 is a simplified block diagram illustrating a version set update coordination using a set of operations according to one embodiment of the present disclosure.

FIG. 17 is a simplified block diagram illustrating a version set update coordination using a set of operations according to one embodiment of the present disclosure. A data center 1700 of the federation 100 includes an infrastructure 1702 and an ICP 1704. The ICP 1704 initially operates with an installed version set 1705 (version F.11). An external VSM 1710 includes a set of version sets including a first version set 1712 at version F.11 and an updated version set 1714 at version F.12. The VSM 1710 updates the ICP 1704 by replacing version set 1705 (F.11) with an updated version set 1707 (F.12). In addition, the VSM 1710 initiates a series of operations (OPS) 1709 to ensure that the infrastructure 1702 complies with the version set 1707 after being installed. The VSM 1710 may initiate the version update and the OPS 1709 together or choose to start the OPS 1709 based on a service window or other environmental trigger.

In an alternative embodiment, the VSM 1710 starts the OPS 1709 with version set 1705 (version F.11) as a way to prepare for the change to the version set 1707 (version F.12). In this case, the OPS 1709 may trigger actions in the VSM 1710 or be triggered by the version set change.

Figure 18:
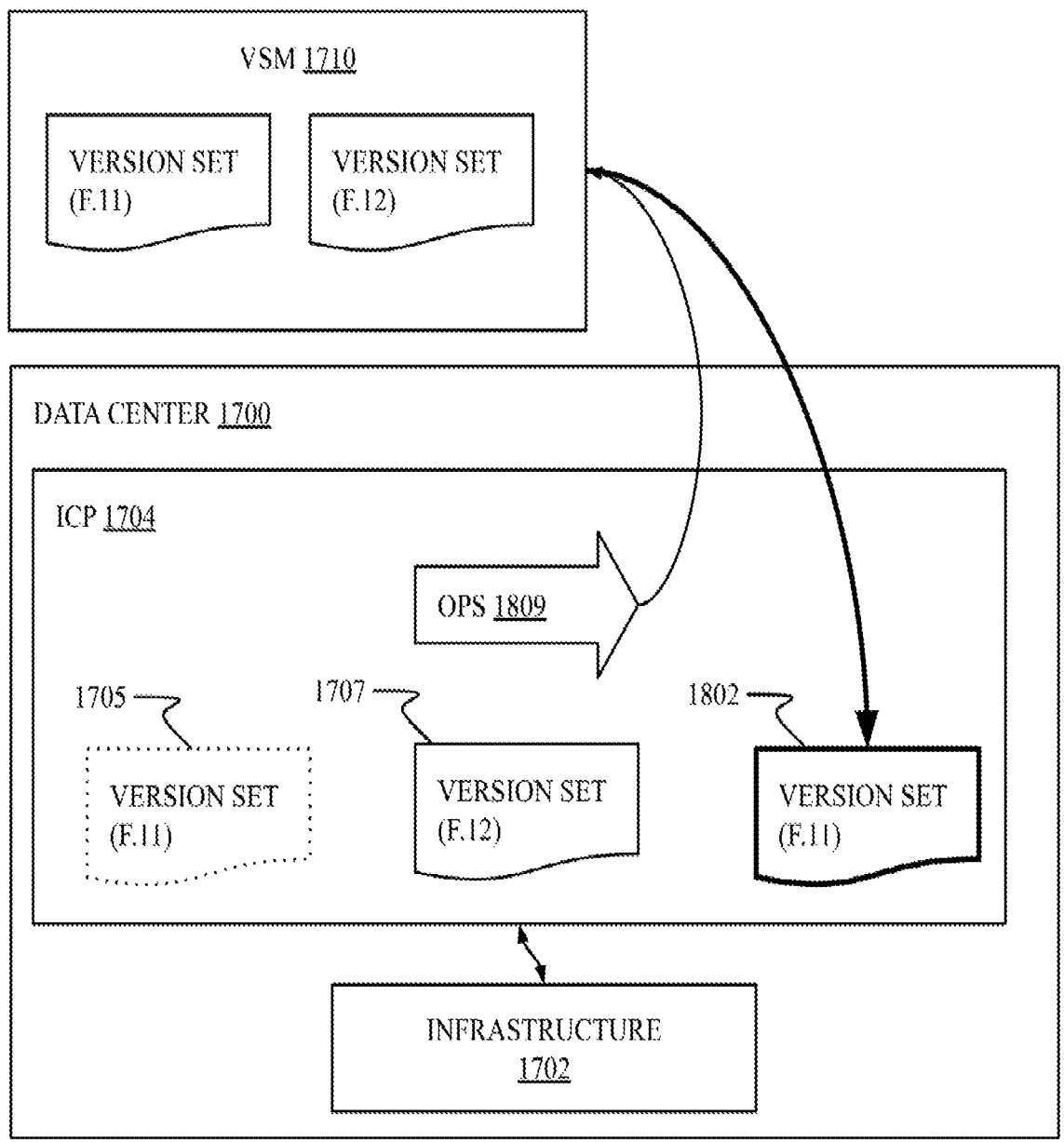
FIG. 18 is a simplified block diagram illustrating a version set update coordination and error recovery using another set of operations according to one embodiment of the present disclosure.

FIG. 18 is a simplified block diagram illustrating version set update coordination and error recovery using another set of operations according to one embodiment of the present disclosure. The data center 1700 with infrastructure 1702 and ICP 1704 is shown again along with the external VSM 1710. Again, the ICP 1704 initially operates with the installed version set 1705 at (F.11) in which the VSM 1710 coordinates to update to the version set 1707 (F.12). In this case, however, the OPS 1709 is replaced by OPS 1809 that is configured to detect any failures of the upgrade to version F.12 and trigger the VSM 1710 (external trigger). In the event OPS 1809 detects a failure after the upgrade to version F.12, the VSM 1710 is informed of the failure and reverts the ICP 1704 back to version F.11 as shown as the version set 1802.

This mechanism provides a useful safety mechanism for a VSM making automated changes to ICPs or operators choosing to implement "blue-green" or rolling upgrades. In the case of a multi-site version set change, the VSM managing the rollout may halt further operations until the problem is resolved.

Figure 19:
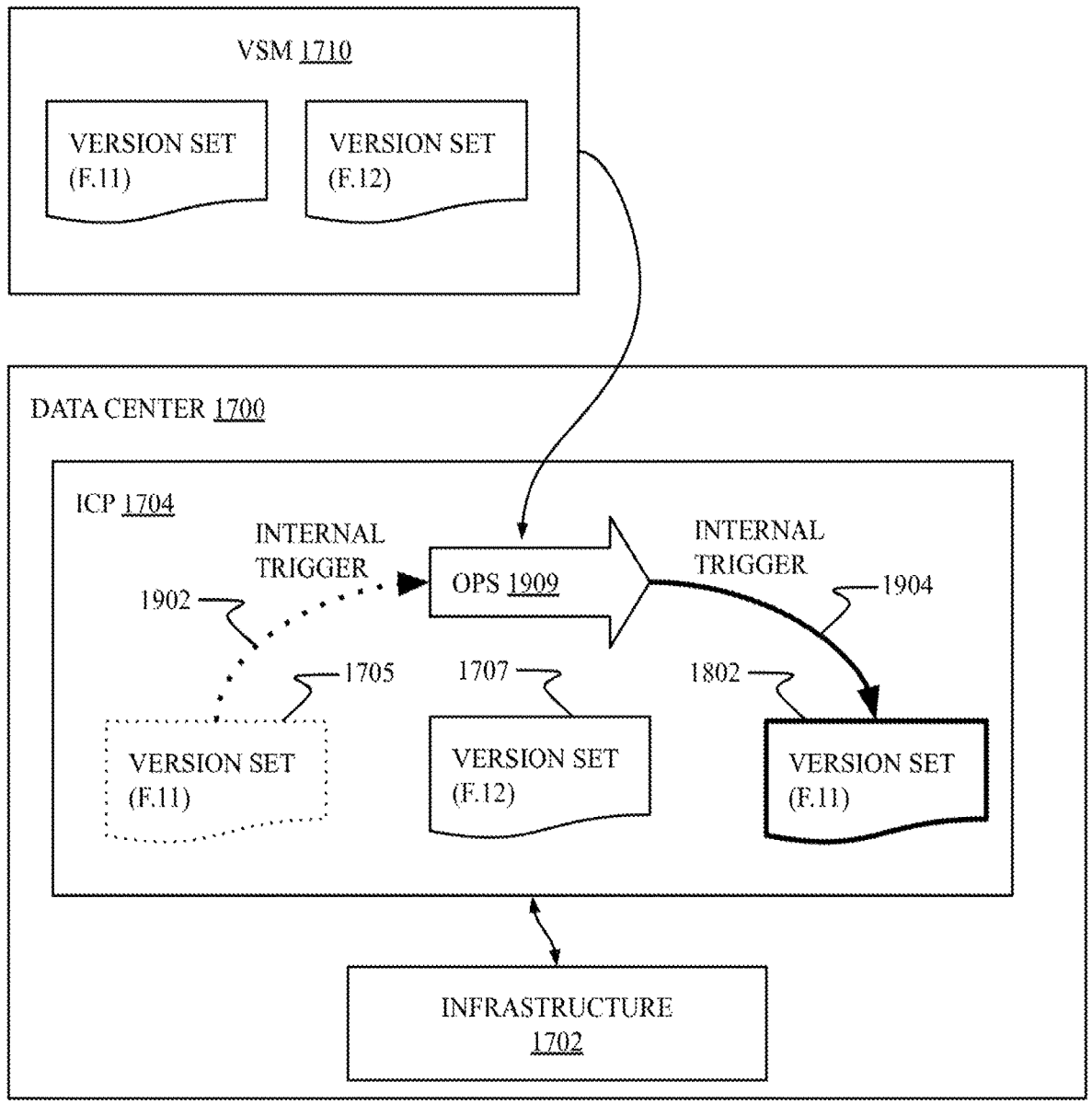
FIG. 19 is a simplified block diagram illustrating a version set update coordination and error recovery using another set of operations with internal triggers according to one embodiment of the present disclosure.

FIG. 19 is a simplified block diagram illustrating update coordination and error recovery according to another embodiment of the present disclosure. The data center 1700 with infrastructure 1702 and ICP 1704 is shown again along with the external VSM 1710. Again, the ICP 1704 initially operates with the installed version set 1705 (F.11) in which the VSM 1710 coordinates to update to the version set 1707 (F.12). In this case, however, the OPS 1809 is replaced by OPS 1909 which includes internal triggers 1902 and 1904 for detecting failure of the upgrade and reversion back to the original version set 1802 (F.11). In this case, the OPS 1909 internally monitors and coordinate changes without relying on further management operation of the VSM 1710. Again, this mechanism provides a useful safety mechanism for a VSM making automated changes to ICPs or operators choosing to implement "blue-green" or rolling upgrades. In the case of a multi-site version set change, the VSM managing the rollout may halt further operations until the problem is resolved.

Figure 20:
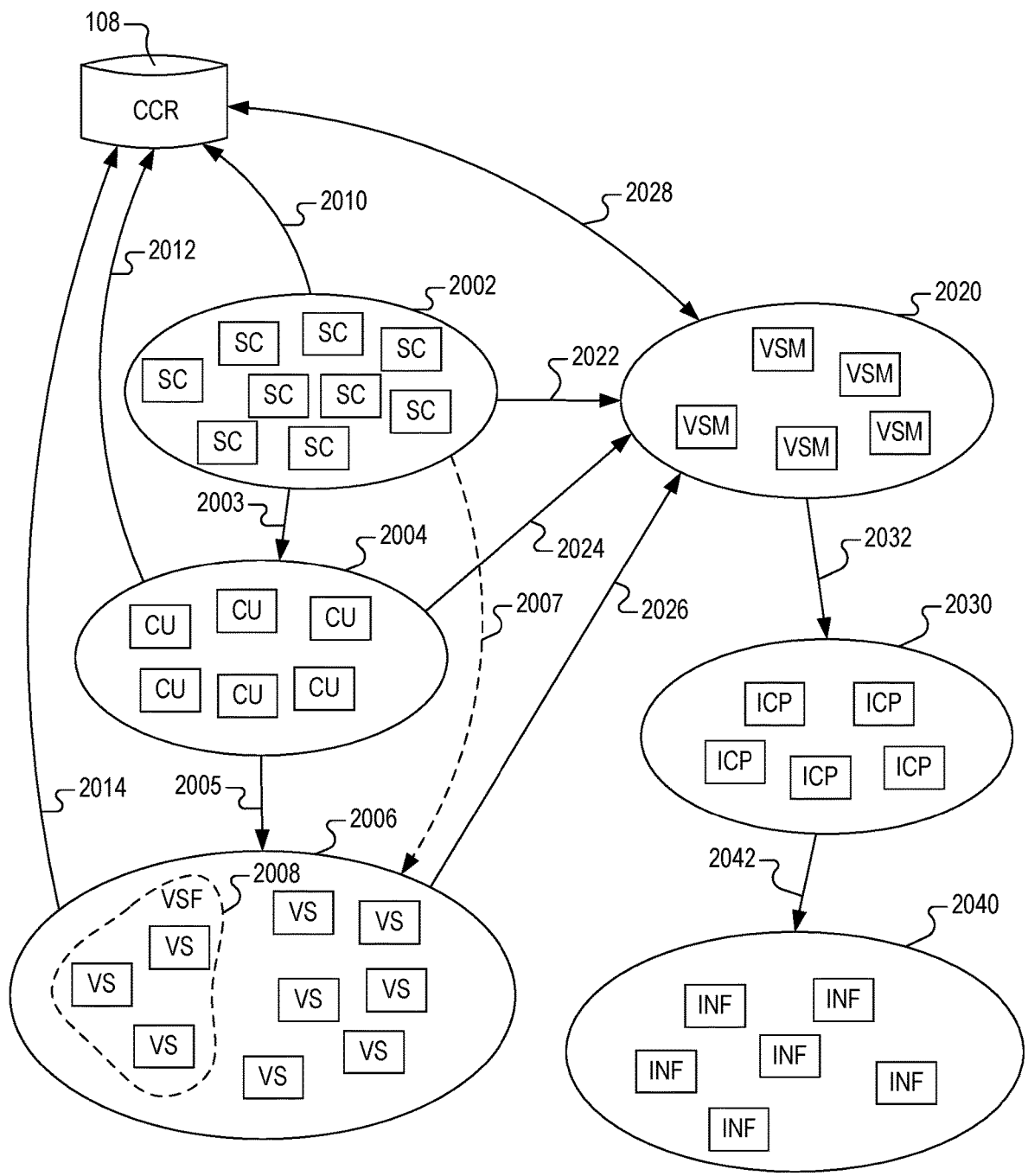
FIG. 20 is a figurative diagram illustrating the collective configuration content of the federation according to one embodiment of the present disclosure.

FIG. 20 is a figurative diagram illustrating the collective configuration content of the federation 100 according to one embodiment of the present disclosure. A collection of subcomponents (SC) 2002 represents the subcomponents that are distributed among the data centers 102 of the federation. Each SC includes an instruction set, a command set, code, etc., that performs a given configuration function. A collection of catalog units (CU) 2004 represents the catalog units that are distributed among the data centers 102 of the federation 100. An arrow 2003 represents that each catalog unit may include one or more of the subcomponents of the collection of subcomponents 2002. A collection of version sets (VS) 2006 represents the version sets that are distributed among the data centers 102 of the federation 100. An arrow 2005 represents that each version set may include one or more of the catalog units of the collection of catalog units 2004. A dashed line 2007 represents that one or more of the version sets may include one or more of the subcomponents that may or may not be contained within any of the catalog units. A version set family (VSF) 2008 illustrates that one or more up to all of the version sets may belong to separate version set families.

An arrow 2010 from the collection of subcomponents 2002 to the central configuration repository (CCR) storage 108 represents that any number up to all of the subcomponents may be copied and stored in the configuration repository storage 108. An arrow 2012 from the collection of catalog units 2004 to the configuration repository storage 108 represents that any number up to all of the catalog units may be copied and stored in the configuration repository storage 108. An arrow 2014 from the collection of version sets 2006 to the configuration repository storage 108 represents that any number up to all of the version sets may be copied and stored in the configuration repository storage 108.

A collection of version set managers (VSM) 2020 represents the VSMs that are distributed among the data centers 102 of the federation 100. Arrows 2022, 2024, and 2026 represent that any one or more of the VSMs has access to and may include one or more of the subcomponents, catalog units, and version sets and VSFs, respectively. A double arrow 2028 illustrates that one or more of the VSMs may have access to the subcomponents, catalog units, and version sets and VSFs stored in the configuration repository storage 108, and may be used to update the information stored within the configuration repository storage 108.

A collection of ICPs 2030 represents the ICPs that are distributed among the data centers 102 of the federation 100. An arrow 2032 represents that any up to all of the ICPs may be managed by one or more of the VSMs as previously described. Although the VSMs are represented separately, any one or more of the VSMs may be incorporated within any of the ICPs as previously described.

A collection of infrastructures (INF) 2040 represents the infrastructures that are distributed among the data centers 102 of the federation 100. An arrow 2042 represents that any up to all of the INFs may be managed by one or more of the ICPs as previously described.

FIG. 20 represents and illustrates that each of the SCs of the collection of subcomponents 2002 of the federation 100 are immutable in that they are separate and unique from each other. Any change within any SC spawns a new and different SC within the collection of subcomponents 2002. The tracking of the subcomponents may be performed locally by a corresponding ICP or VSM(s) or remotely by the corresponding VSM(s).

In addition, each of the CUs of the collection of catalog units 2004 of the federation 100 are composed of one or more of the SCs and are also immutable in that they are separate and unique from each other. Any change within any CU, such as replacement of one or more SCs, spawns a new and different CU within the collection of catalog units 2004. When multiple SCs are grouped together within an CU, they are managed as a collective CU unit. The tracking of the catalog units may be performed locally by a corresponding ICP or VSM(s) or remotely by the corresponding VSM(s).

In addition, each of the VSs of the collection of version sets 2006 of the federation 100 are composed of one or more of the CUs and/or SCs and are also immutable in that they are separate and unique from each other. Any change within any VS, such as replacement of one or more SCs or CUs, spawns a new and different VS within the collection of version sets 2006. This includes versioning from one version set to another within a VSF. When multiple SCs and/or CUs are grouped together within a VS, they are managed as a collective VS unit. Versioning of VSs within a given VSF facilitates tracking of related configuration information for a given data center or group of related data centers. The tracking of the version sets and VSFs may be performed locally by a corresponding ICP or VSM(s) or remotely by the corresponding VSM(s).

In addition, FIG. 20 illustrates management of the composable and immutable configuration content (SCs, CUs, VSs, VSFs) used by the ICPs for configuring the infrastructures of the data centers 102 of the federation 100. Such management may incorporate local and global management functions regardless of the ultimate size of the federation 100. The composable and immutable configuration content may easily be tracked and managed by each VSM of the federation 100.

The present description has been presented to enable one of ordinary skill in the art to make and use the present invention as provided within the context of particular applications and corresponding requirements. The present invention is not intended, however, to be limited to the particular embodiments shown and described herein, but is to be accorded the widest scope consistent with the principles and novel features herein disclosed. Many other versions and variations are possible and contemplated. Those skilled in the art should appreciate that they can readily use the disclosed conception and specific embodiments as a basis for designing or modifying other structures for providing the same purposes of the present invention without departing from the spirit and scope of the invention.

The invention claimed is:

1. A federation with distributed edge configuration management, comprising:
a plurality of autonomously managed data centers each located at a corresponding one of a plurality of sites remotely located from each other, each data center comprising:
an infrastructure comprising physical resources including at least one computer server;
at least one storage that stores state information comprising dynamic operating status and identification information indicative of a current state of the infrastructure and that stores configuration information of the infrastructure, wherein the configuration information comprises composed immutable content incorporating automation tasks and instructions to effectuate state changes of the infrastructure according to consistent operational practices that accommodate variations among the plurality of data centers of the federation; and a configuration platform, locally coupled to the infrastructure and to the at least one storage at a corresponding one of the plurality of sites, comprising a network interface for communicating via a communications network, and a configuration processor that autonomously configures the infrastructure in response to a request by dynamically accessing the configuration information and generating and executing a workflow comprising a sequence of operations to effectuate a change of state of the infrastructure to achieve a target state.

2. The federation of claim 1, wherein the composed immutable content is decomposed on a plurality of modular layers of the at least one storage that are managed independently from each other.

3. The federation of claim 1, wherein the composed immutable content comprises a catalog unit, wherein the catalog unit comprises a plurality of subcomponents, wherein each of the plurality of subcomponents comprises at least one declarative instruction, and wherein the configuration platform facilitates a change of any of the plurality of subcomponents only by replacing the catalog unit.

4. The federation of claim 1, wherein the composed immutable content comprises a catalog unit having a first identity, wherein the catalog unit comprises a plurality of subcomponents, wherein each of the plurality of subcomponents comprises at least one declarative instruction, and wherein the configuration platform facilitates a change of any of the plurality of subcomponents only by replacing the subcomponent with an updated subcomponent and by changing the first identity of the catalog unit to a second identity.

5. The federation of claim 1, wherein the composed immutable content comprises a version set having a first version identifier, wherein the version set comprises a plurality of subcomponents, wherein each of the plurality of subcomponents comprises at least one declarative instruction, and wherein the configuration platform facilitates a change of any of the plurality of subcomponents by replacing the subcomponent with an updated subcomponent and by changing the first version identifier of the version set to a second version identifier.

6. The federation of claim 1, wherein the composed immutable content comprises a version set having a first version identifier, wherein the version set comprises a plurality of catalog units each having a unique identifier, and wherein each of the plurality of catalog units comprises at least one subcomponent, wherein each of the plurality of subcomponents comprises at least one declarative instruction, and wherein the configuration platform facilitates a change of any of the plurality of subcomponents within a catalog unit by replacing the subcomponent with an updated subcomponent, by changing the identifier of the catalog unit to an updated unique identifier, and by changing the first version identifier of the version set to a second version identifier.

7. The federation of claim 6, wherein the first version identifier identifies a first version set, wherein the second version identifier identifies a second version set, and wherein the first and second version sets are part of a common version set family.

8. The federation of claim 1, wherein the configuration platform, responsive to an infrastructure configuration request received via the communication network, accesses and updates the stored configuration information with updated configuration information provided by the infrastructure configuration request.

9. The federation of claim 1, further comprising a version set manager, comprising:
a repository storing a plurality of subcomponents; and
a set of version sets comprising at least one version set in which each version set includes selected ones of the plurality of subcomponents stored in the repository.

10. The federation of claim 9, wherein the version set manager is operated by a first data center that manages an installed version set of a second data center.

11. The federation of claim 9, wherein the version set manager is incorporated within the configuration platform of a first data center.

12. The federation of claim 9, wherein the version set manager is incorporated within the configuration platform of a first data center for managing a first version set of the first data center and for managing a second version set of a second data center.

13. The federation of claim 9, wherein the version set manager manages a first version set of a first data center and also manages a second version set of a second data center.

14. The federation of claim 9, wherein a first data center comprises:
a plurality of different infrastructures and a corresponding plurality of different configuration platforms; and
wherein the version set manager manages an installed version set of each of the plurality of configuration platforms.

15. The federation of claim 14, wherein a first infrastructure comprises a development infrastructure for developing a version set, wherein a second infrastructure comprises a test infrastructure for testing a developed version set, and wherein a third infrastructure comprises a production infrastructure for placing a tested version set into production.

16. The federation of claim 9, further comprising:
a first data center comprising a plurality of different configuration platforms each for redundantly managing the infrastructure of the first data center; and
wherein the version set manager manages an installed version set of each of the plurality of configuration platforms.

17. The federation of claim 9, wherein the version set manager instructs the configuration platform to update the version set and to execute a series of operations that ensure that the infrastructure complies with an updated version set.

18. The federation of claim 17, wherein the series of operations identifies a failure of the updated version set and triggers the version set manager to re-install an original version set.

19. The federation of claim 17, wherein the series of operations identifies a failure of the updated version set and includes at least one internal trigger that instructs the configuration platform to re-install an original version set.

20. The federation of claim 1, further comprising:
a shared repository that stores a plurality of subcomponents; and
a plurality of version set managers, each comprising a set of version sets comprising at least one version set in which each version set includes selected ones of the plurality of subcomponents stored in the repository; and wherein the plurality of version set managers collectively manage a version set used by the configuration platform of a first data center.

21. The federation of claim 20, wherein each of the plurality of version set managers are operated by a one of a corresponding plurality of data centers other than the first data center.

22. The federation of claim 1, further comprising:
first and second version set managers, each comprising a repository storing a plurality of subcomponents and further comprising a set of version sets including at least one version set in which each version set includes selected ones of the plurality of subcomponents stored in the repository; and
a first data center comprising first and second configuration platforms each for redundantly managing the infrastructure of the first data center;
wherein the first configuration platform incorporates the first version set manager for managing first and second version sets of composed immutable content of each of the first and second configuration platforms, respectively, and wherein the second version set manager manages the version sets of the first version set manager.

23. The federation of claim 22, wherein the second version set manager is operated by a second data center.

* * * * *